(12) United States Patent
Dill, Jr. et al.

(10) Patent No.: US 6,226,149 B1
(45) Date of Patent: May 1, 2001

(54) PLANAR STITCHED WRITE HEAD HAVING WRITE COIL INSULATED WITH INORGANIC INSULATION

(75) Inventors: Frederick Hayes Dill, Jr., S. Salem, NY (US); Robert E. Fontana, San Jose, CA (US); Richard Hsiao, San Jose, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/212,119

(22) Filed: Dec. 15, 1998

(51) Int. Cl.[7] ............................. G11B 5/147; G11B 5/127
(52) U.S. Cl. ........................................ 360/126; 29/603.14
(58) Field of Search ...................... 360/121, 126, 360/123, 125; 29/603.14, 603.15, 603.18

(56) References Cited

U.S. PATENT DOCUMENTS

| | | | |
|---|---|---|---|
| 3,685,144 | * 8/1972 | Trimble | 29/603 |
| 4,752,850 | * 6/1988 | Yamada et al. | 360/126 |
| 4,816,946 | * 3/1989 | Kira et al. | 360/126 |
| 5,113,300 | * 5/1992 | Ikeda et al. | 360/126 |
| 5,448,822 | * 9/1995 | Wu et al. | 29/603 |
| 6,069,775 | * 5/2000 | Chang et al. | 360/126 |
| 6,072,671 | * 6/2000 | Gill | 360/126 |

* cited by examiner

Primary Examiner—Allen T. Cao
(74) Attorney, Agent, or Firm—Gray Cary Ware & Friedenrich; Ervin F. Johnston

(57) ABSTRACT

A write head has a second pole tip layer, a coil layer and a write coil insulation layer that are planarized at their top surfaces. A thin top insulation layer insulates the top of the coil layer from a yoke portion of the second pole piece which is connected to the second pole tip layer in the pole tip region and connected to a first pole piece layer in a back gap region. In a preferred embodiment the write gap layer extends throughout the yoke region and provides the only insulation between the first pole piece layer and the coil layer. Further, it is preferred that the write coil insulation layer be an inorganic material such as silicon dioxide ($SiO_2$). Several embodiments of the write head are provided along with novel methods of making.

40 Claims, 15 Drawing Sheets

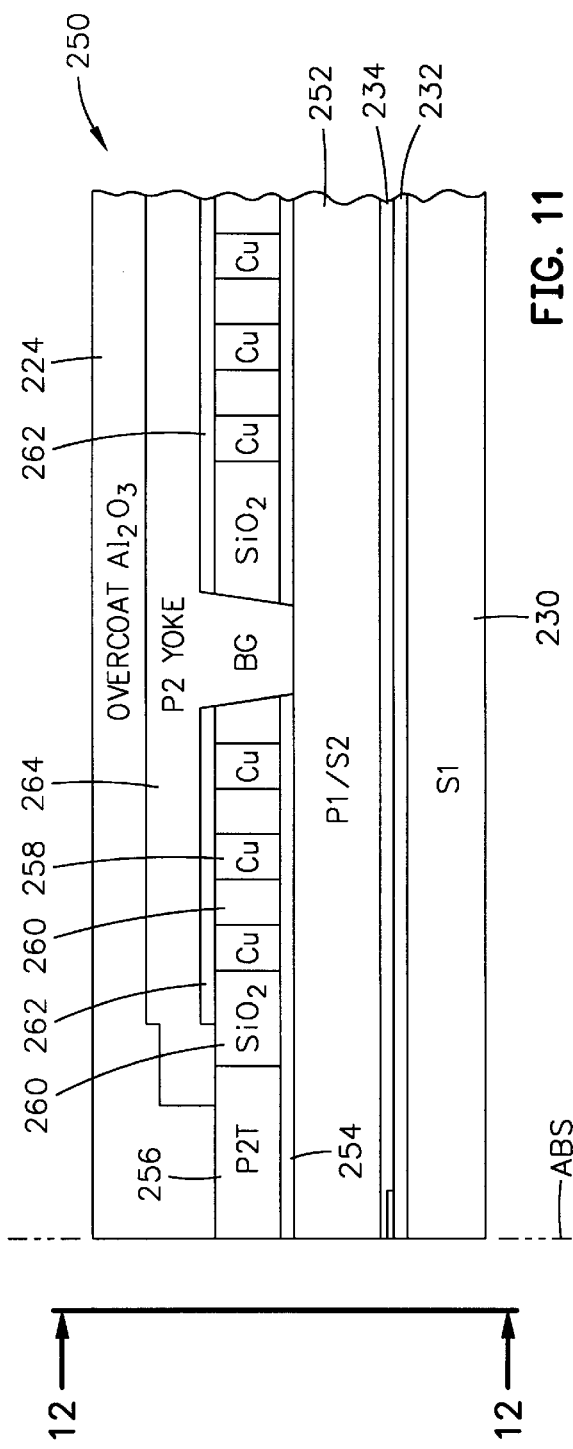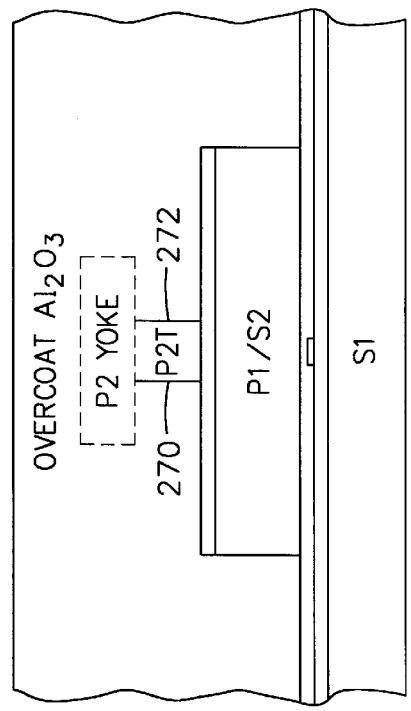

PLANAR STITCHED WRITE HEAD HAVING WRITE COIL INSULATED WITH INORGANIC INSULATION

BACKGROUND OF THE INVENTION

1. Field of the Invention

The present invention relates to a planar stitched write head having a write coil that is insulated by inorganic insulation and, more particularly, to a write head having a second pole tip and coil layer that are planarized with silicon dioxide located between the turns of the coil layer and between the coil layer and the second pole tip.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap which is recessed from the ABS. Current conducted to the coil layer induces a magnetic field across the gap between the pole pieces. This field fringes across the gap at the ABS for the purpose of writing information in tracks on moving media, such as a tape in a tape drive or in circular tracks on the aforementioned rotating disk.

Since the second pole tip is generally the last pole tip to pass locations on the circular track of a rotating disk, it is important that the width of the second pole tip be as narrow as possible for increasing the track width density of the write head. The track width density is expressed in the art as tracks per inch (TPI). Research efforts have narrowed this track width thereby increasing magnetic disk drive capabilities from kilobytes to megabytes to gigabytes. An ongoing problem in the art, however, is producing a narrow second pole tip with good side wall definition. The second pole tip is typically made by patterning photoresist that has an opening where the second pole tip is to be plated. Unfortunately, the high topography behind the second pole tip in typical write heads causes light to be reflected toward the ABS during a light exposure step of the photoresist adjacent the desired side walls of the second pole tip. This light exposes photoresist adjacent to the intended side walls which, upon developing, is removed and causes an irregularity when the second pole tip is plated. A main contributor to this high topography is the insulation stack where the coil layer is embedded and a seed layer covering the insulation stack that is highly reflective. A reduction in this topography decreases what is known in the art as "reflective notching" so as to produce a more highly defined second pole tip.

The aforementioned high topography behind the second pole tip also degrades the performance of the yoke portion of the second pole piece which extends from the second pole tip to the back gap if the yoke is deposited by sputtering techniques. When the yoke portion of the second pole piece slopes down from the high topography to the second pole tip, it makes a curve which changes its magnetic properties. Some of these properties are uniaxial anisotropy field ($H_K$) and coercivity ($H_c$). Accordingly, it would be desirable to construct a planar second pole piece so that its magnetic properties would not be altered. Still a further problem of the high topography is that after completion of the head a thick overcoat layer is required in order to protect the yoke and pole tip portions of the head.

The aforementioned insulation stack is typically made from various layers of hard baked photoresist. In the construction sequence a layer of photoresist is spun on a wafer which is substantially planarized thereacross. The photoresist layer is then photopatterned with light exposing areas that are to be removed. The photoresist layer is then developed with a developer which causes the exposed areas to dissolve so they can be removed. The layer is then soft baked at a temperature of 90°–120° C. which causes the layer to solidify with rounded edges. After constructing a coil layer on a soft baked photoresist layer one or more additional photoresist layers may be constructed and soft baked in the same manner. Thereafter, the photoresist layers are hard baked at a temperature of 230° C. which hardens the photoresist layers. Photoresist is an organic material that has a different coefficient of expansion than other materials in the head, such as aluminum oxide ($Al_2O_3$) employed for the overcoat layer. When the magnetic head is operating within a disk drive its operating temperature is at least above 100° C. This causes the hard baked photoresist insulation stack to expand more than the overcoat layer which causes the overcoat layer to protrude beyond the pole tips at the ABS. This protrusion can ruin the head or severely degrade its performance. Further, the hard baking of the photoresist layers can result in loss of signal amplitude for some read sensors, such as spin valve sensors, in an adjoining read head. The hard baked temperatures cause some intermixing of the materials of the layers which can significantly degrade their performance. Still further, the hard baked photoresist insulation stack has poor heat dissipation which aggravates all of the aforementioned problems.

A recap of the aforementioned problems is as follows:

(1) Difficulty of second pole tip track width definition because of severe topography;

(2) Magnetic property change of a sputtered yoke portion of the second pole piece as it curves over severe topography;

(3) Requirement for thick overcoat deposition;

(4) Protrusion of the overcoat layer at the ABS due to thermal expansion of a hard baked photoresist insulation stack;

(5) Signal amplitude loss of some spin valve sensors due to hard baking of the photoresist layers; and (6) Inadequate heat dissipation of the hard baked photoresist insulation stack.

SUMMARY OF THE INVENTION

The first three problems, mentioned hereinabove, are overcome in the present invention by providing a write head wherein the second pole tip and the write coil are planarized at their top surfaces. The write head includes a first pole piece that is located in pole tip, yoke and back gap regions. The write gap layer is located on the first pole piece in the pole tip region and a second pole tip layer is located on the write gap layer in the pole tip region. The coil layer, which has multiple spaced apart turns, is located on the first pole piece in the yoke region and a write coil insulation layer is located between the turns of the coil and between the coil layer and the second pole tip layer. The second pole tip layer, the coil layer and the insulation layer have top surfaces which lie within a common flat surface. A thin top insulation layer covers the top surface of the turns of the coil layer and a second pole piece layer is on top of the top insulation layer, engages the second pole tip layer in the pole tip region and engages the first pole piece in the back gap region. The second pole tip can be constructed with high track width definition because the patterned photoresist layer is on a flat surface instead of a sloping surface typically found in the prior art. The yoke of the second pole piece layer is nearly flat except for the slight step of the top insulation layer which results in substantially no change in magnetic properties of the yoke portion of the second pole piece. Further, because of the overall lack of topography the overcoat deposition can be much thinner than that employed in the prior art.

The last three problems mentioned hereinabove are overcome in the present invention by employing an inorganic material for the write coil insulation layer between the turns of the coil and between the coil layer and the second pole tip. This material is preferably silicon dioxide ($SiO_2$). Silicon dioxide has a similar coefficient of expansion as aluminum oxide ($Al_2O_3$) thereby obviating the protrusion of the aluminum oxide overcoat layer at the ABS. Further, silicon dioxide does not require hard baking at a high temperature which can result in degrading some of the spin valve structures used in read heads. Still further, the silicon dioxide is a better heat dissipator than hard baked photoresist.

After constructing the first pole piece, the write gap layer and the second pole tip layer a unique method is employed for forming the write coil. First, a write coil mask is formed on the second pole tip layer and on the yoke and back gap regions of the first pole piece with a write coil mask opening at a location where the write coil is to be formed. A write coil material layer is then formed on the write coil mask and in the write coil mask opening. The thicknesses of the write coil mask and the write coil material layer are thicker than the thickness of the second pole tip layer. A grinding operation is then employed to grind away a portion of each of the write coil mask and the write coil material layer until the write coil is formed and the write coil and the write coil mask have a common flat surface. The common flat surface is instrumental in substantially planarizing the yoke portion of the second pole piece layer.

An object of the present invention is to provide a more highly defined second pole tip of a write head, planarize the yoke portion of the second pole piece layer and decrease the required thickness of an overcoat layer.

Another object is to provide a write head wherein the coefficient of expansions of the various layers of a write head are more similar so as to prevent protrusion of the overcoat layer at the ABS, eliminate hard baking of photoresist insulation layers of the insulation stack so as to prevent degradation of a spin valve sensor in a read head and improve heat dissipation by providing an insulation stack with improved thermal conductivity.

A further object is to provide a write head which has a combination of the features set forth in the first and second objects hereinabove.

Still another object is to provide a unique method of making a write head which has the features set forth hereinabove.

Other objects and attendant advantages of the invention will become apparent upon reading the specification taken together with the accompanying drawings.

BRIEF DESCRIPTION OF THE DRAWINGS

FIG. 11 is a side elevation view of another embodiment of the present invention;

FIG. 12 is a view taken along plane 12—12 of FIG. 11;

DESCRIPTION OF THE PREFERRED EMBODIMENTS

Magnetic Disk Drive

Figure 1:
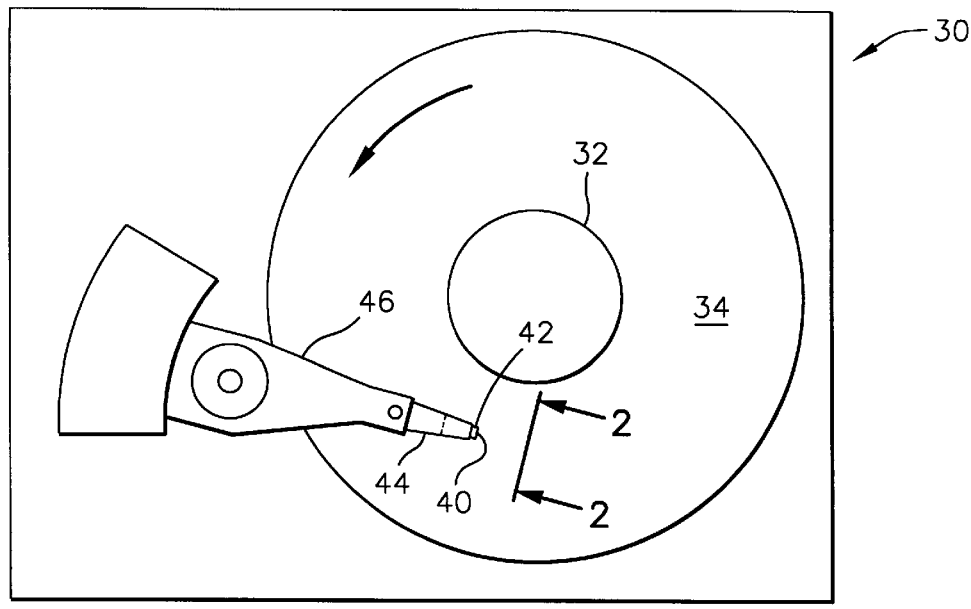
FIG. 1 is a planar view of an exemplary magnetic disk drive.
Figure 2:
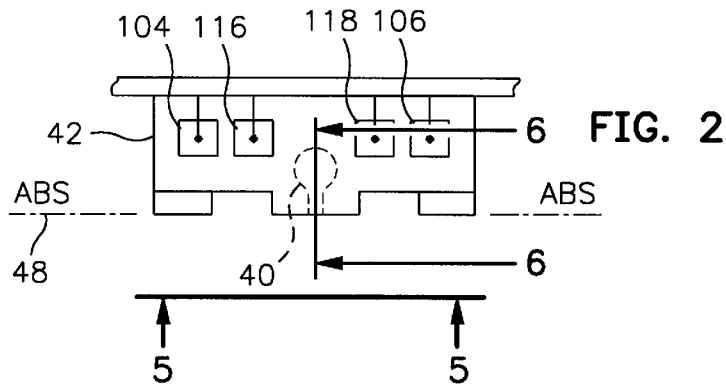
FIG. 2 is an end view of a slider with a magnetic head of the disk drive as seen in plane 2—2.
Figure 3:
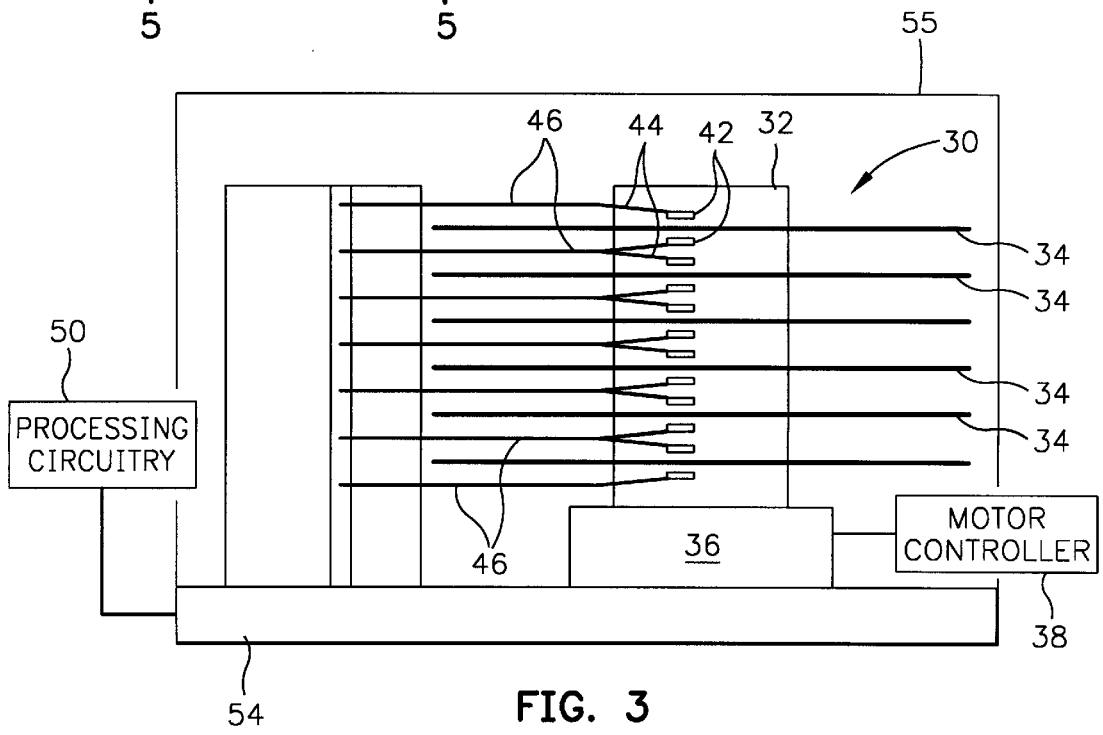
FIG. 3 is an elevation view of the magnetic disk drive wherein multiple disks and magnetic heads are employed.
Figure 4:
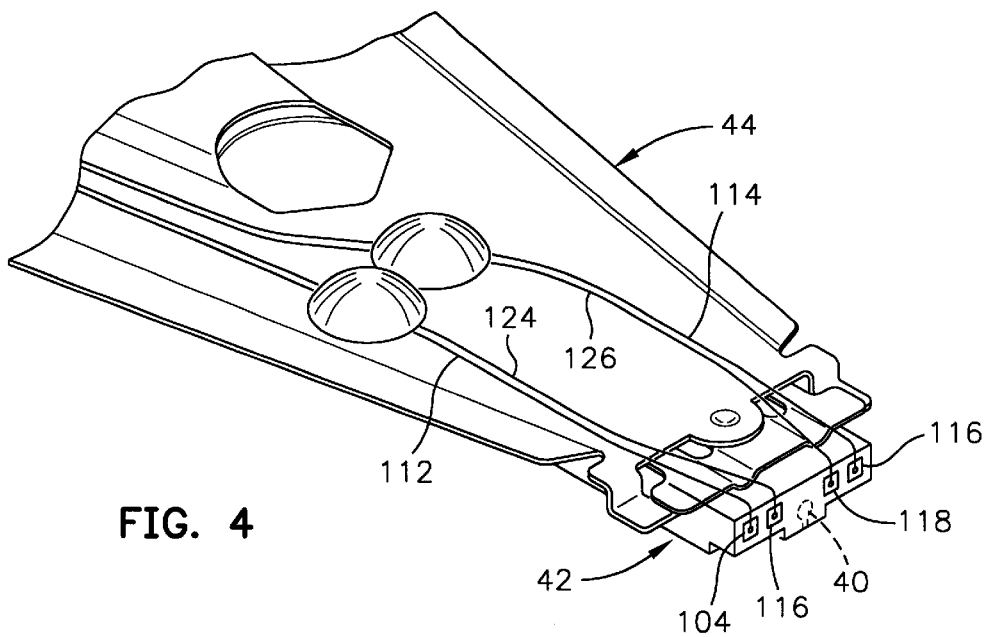
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
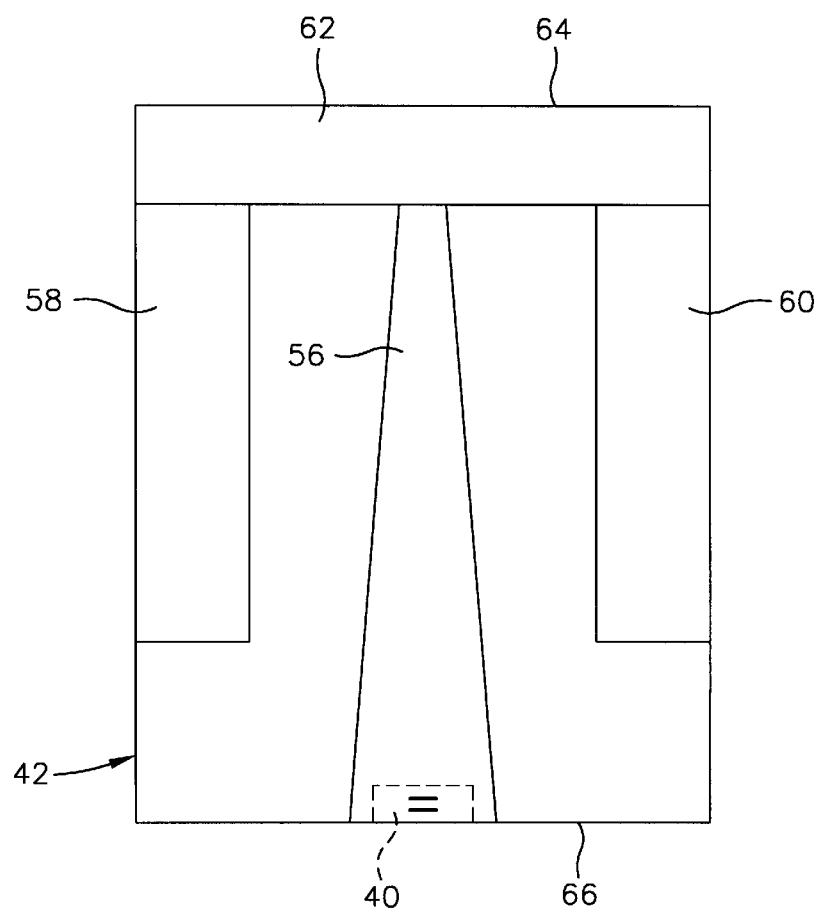
FIG. 5 is an ABS view of the slider taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
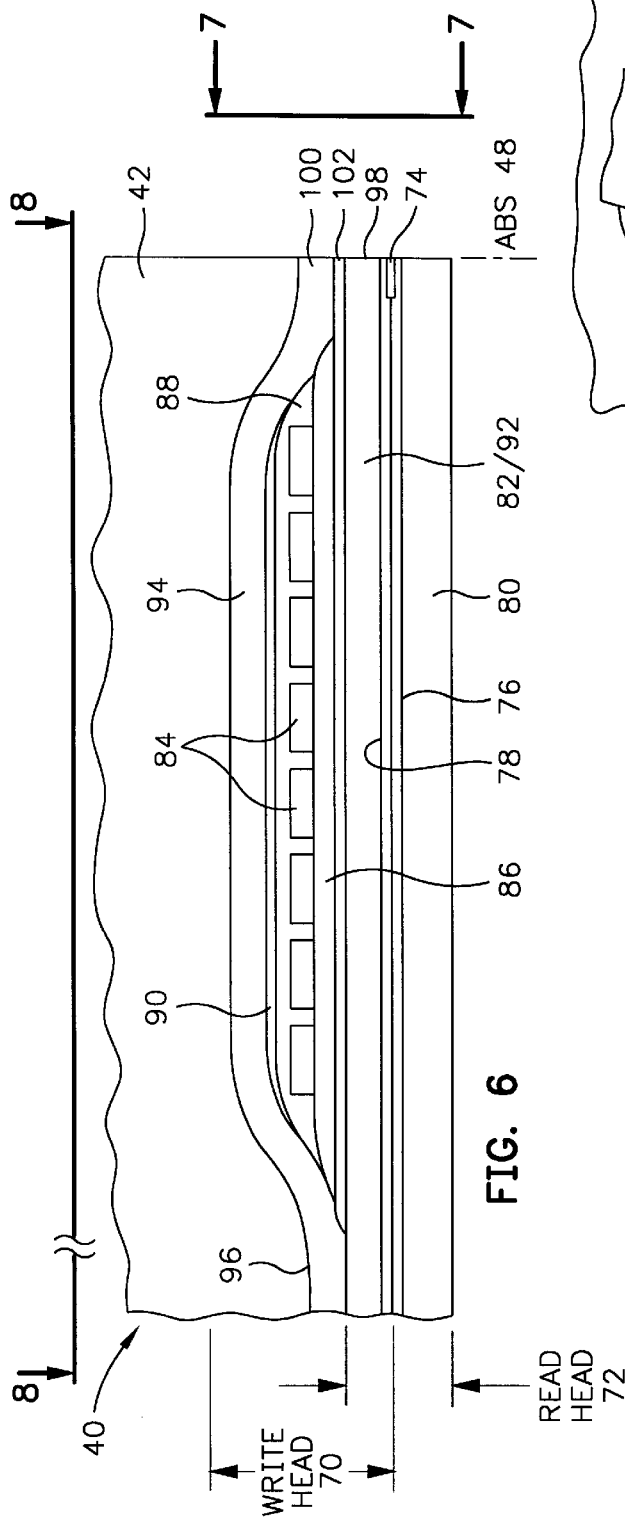
FIG. 6 is a partial view of the slider and magnetic head as seen in plane 6—6 of FIG. 2.
Figure 7:
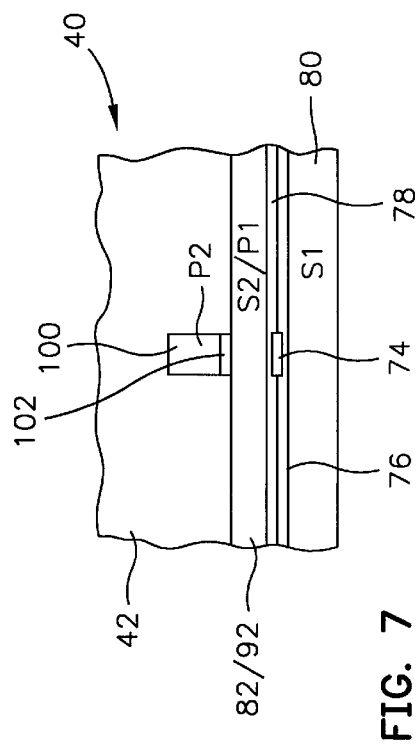
FIG. 7 is a partial ABS view of the slider taken along plane 7—7 of FIG. 6 to show the read and write elements of the magnetic head.

FIG. 6 is a side cross-sectional elevation view of the merged MR head 40, which includes a write head portion 70 and a read head portion 72, the read head portion employing a sensor 74. FIG. 7 is an ABS view of FIG. 6. The sensor 74 is sandwiched between first and second gap layers 76 and 78, and the gap layers are sandwiched between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
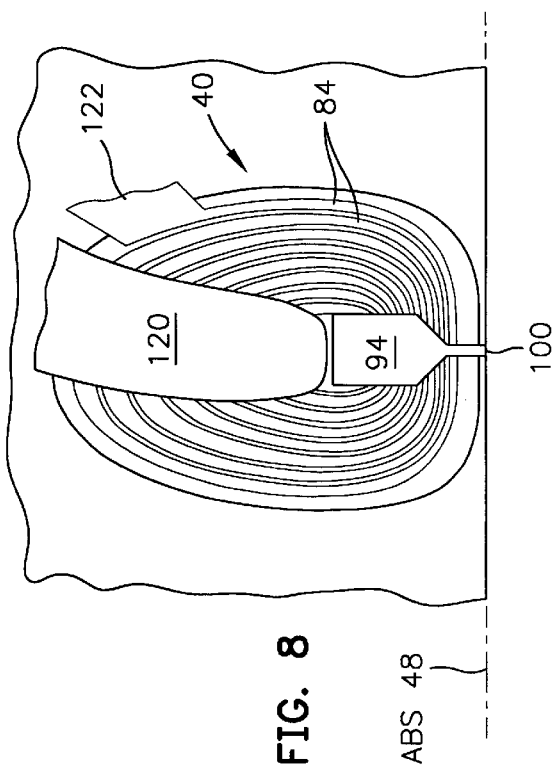
FIG. 8 is a view taken along plane 8—8 of FIG. 6 with all material above the write coil removed.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

FIRST EMBODIMENT OF THE INVENTION

Figure 9:
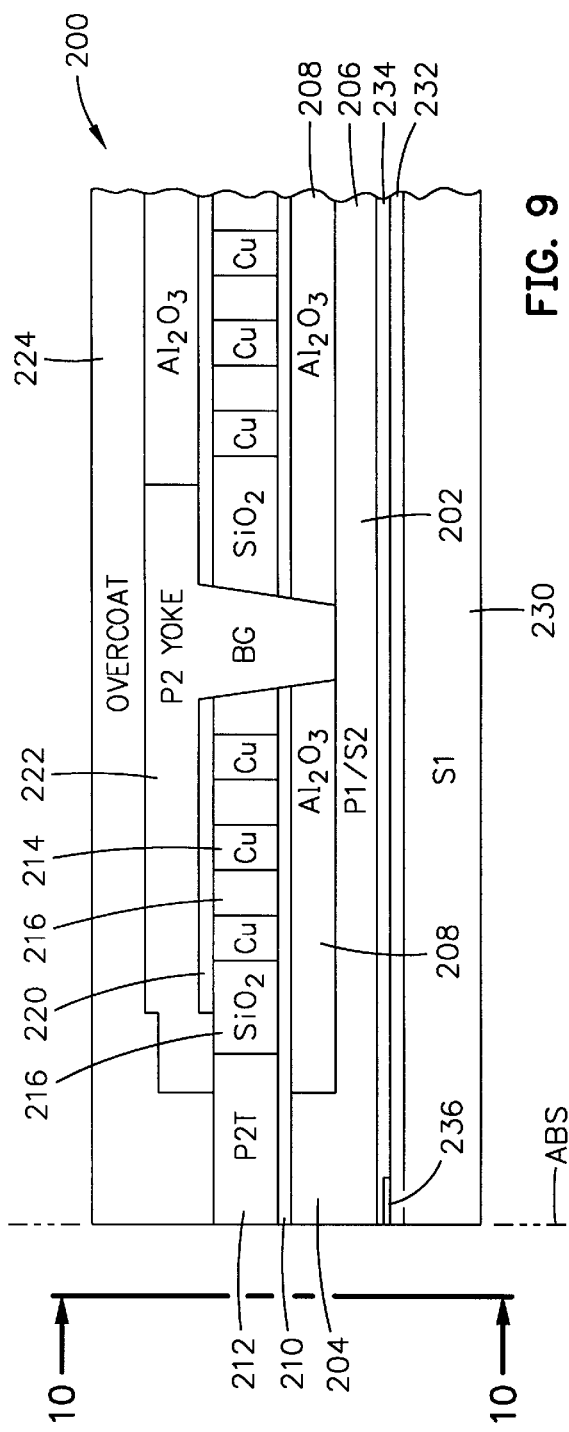
FIG. 9 is a side elevation view of one embodiment of the present invention.
Figure 10:
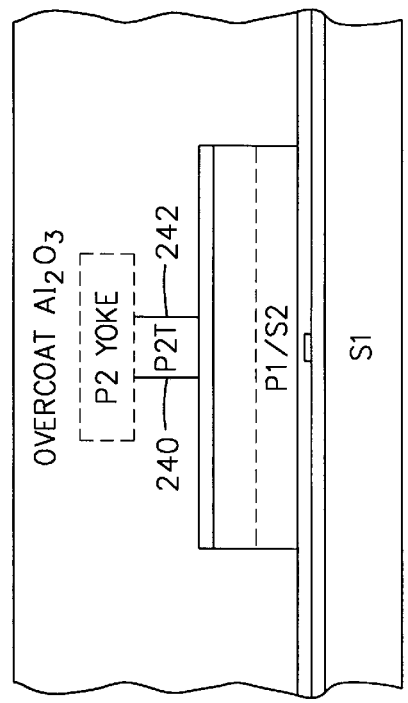
FIG. 10 is a view taken along plane 10—10 of FIG. 9.

The first embodiment 200 of the present invention is shown in FIGS. 9 and 10. The first embodiment of the write head includes a first pole piece (P1) 202 which has a pedestal portion 204 at the ABS and a recessed portion 206 which may extend from the pedestal portion to and beyond the back gap (BG). The pedestal portion 204 and the recessed portion 206 provide a recess wherein recessed insulation material 208 is located and is planar with a top surface of the pedestal portion 204. A preferred material for the recessed insulation material is aluminum oxide ($Al_2O_3$). A write gap layer 210 is located on the pedestal portion 204 in the pole tip region and may extend from the pole tip region to and past the back gap (BG) if desired. A second pole tip (P2) 212 is located on the write gap layer 210 and forms a portion of the ABS. A write coil layer 214 is located on the write gap layer 210 in the yoke region of the head and winds around the back gap (BG). A write coil insulation layer 216 is located between turns of the coil layer 214 and between the coil layer and the second pole tip 212. The top surfaces of the second pole tip layer 212, the coil layer 214 and the write coil insulation layer 216 form a common flat surface. A top insulation layer 220 insulates the top surface of the coil layer 214.

A yoke portion of the second pole piece (P2 yoke) 222 is on the top insulation layer 220 and is magnetically connected to the second pole tip 212 in the pole tip region and is magnetically connected to the first pole piece 206 at the back gap (BG). The recessed insulation layer 208, the write gap layer 210 and the top insulation layer 220 are preferably aluminum oxide ($Al_2O_3$) and the write coil insulation layer 216 is preferably silicon dioxide ($SiO_2$). It can be seen from this construction that the yoke portion 222 of the second pole piece is substantially planar except for the minor step of the top insulation layer 220. The top insulation layer 220, however, can be very thin, in the order of 1,000 Å to 2,000 Å. Essentially, the yoke portion 222 of the second pole piece is substantially flat so as to prevent a curve over an insulation stack which is shown by the second pole piece layer 94 in FIG. 6.

The silicon dioxide ($SiO_2$) material of the write coil insulation layer 216 has a coefficient of expansion close to the coefficient of expansion of the overcoat layer 224 which covers the write head. Accordingly, upon expansion due to heat the write coil insulation layer 216 will not force the overcoat layer 224 beyond the ABS which is a potential problem caused by the insulation stack comprising layers 86, 88 and 90 in FIG. 6.

Below the write head is a read head which includes a first shield layer 230 and a second shield layer. In a merged head the second shield layer may comprise the first pole piece 202 of the write head. First and second read gap layers 232 and 234 are located between the first and second shield layers 230 and 202 and a read sensor 236 is located between the first and second read gap layers 232 and 234. When the layer 202 is employed as the first pole piece for the write head and a second shield layer for the read head, the combined head structure is referred to as a merged head. When these layers are separate the combined head is referred to as a piggyback head.

It should be noted that the write coil insulation layer 216 may also be located between turns of the coil layer behind the back gap (BG). FIG. 10 shows an ABS illustration of FIG. 9 where the side walls 240 and 242 of the second pole tip 212 are highly defined because the write head is planar behind the second pole tip 212. Accordingly, patterned photoresist employed for constructing the second pole tip 212 will not receive reflective light from the high topography of an insulation stack, as shown in FIG. 6, during the light exposure step of the photoresist. Further, the overcoat layer 224 can be made thin because it does not have to account for the high topography caused by the insulation stack in FIG. 6.

SECOND EMBODIMENT OF THE PRESENT INVENTION

FIGS. 11 and 12 show a second embodiment 250 of the present write head. The write head 250 includes a first pole piece 252 which is planar from the ABS to and past the back gap (BG). The write gap layer 254 is located on the first pole piece 252 from the ABS to at least the back gap (BG). The write gap layer 254 serves as an etch step in this embodiment, which will be described in detail under the method of construction of the second embodiment. A second pole tip layer 256 is located on the write gap layer 254 in the pole tip region and a write coil layer 258 is located on the write gap layer 254 in the yoke region. A write coil insulation layer 260 is located between the turns of the write coil 258 and between the write coil and the second pole tip layer 256. Top surfaces of the second pole tip 256, the write coil layer 258, and the write coil insulation layer 260 form a common flat surface. The top insulation layer 262 is located on the top flat surface and insulates the top surface of the coil layer 258.

A yoke portion 264 of a second pole piece is located on the top insulation layer 262 and is magnetically connected to the second pole tip layer at 264 and is magnetically connected to the first pole piece 252 at the back gap (BG). It should be noted in this embodiment that the write coil layer 254 is the only layer insulating the coil layer 258 from the first pole piece 252. Accordingly, the first pole piece 252 of the embodiment in FIG. 11 will have greater flux carrying capability than the first pole piece of the embodiment shown in FIG. 9.

The definition of the side walls 270 and 272 of the second pole tip layer 256, shown in FIG. 12, are well-defined in the same manner as the side walls 240 and 242, shown in FIG. 10. Further, the yoke portion 264 of the second pole piece is substantially flat in the same manner as the yoke portion 222 of the second pole piece in FIG. 9. Again, the write gap layer 254 and the top insulation layer 262 are preferably aluminum oxide ($Al_2O_3$) and the write coil insulation layer is preferably silicon dioxide ($SiO_2$). The read head below this write head is the same as the read head shown in FIG. 9.

METHOD OF MAKING FIRST EMBODIMENT

Figure 13:
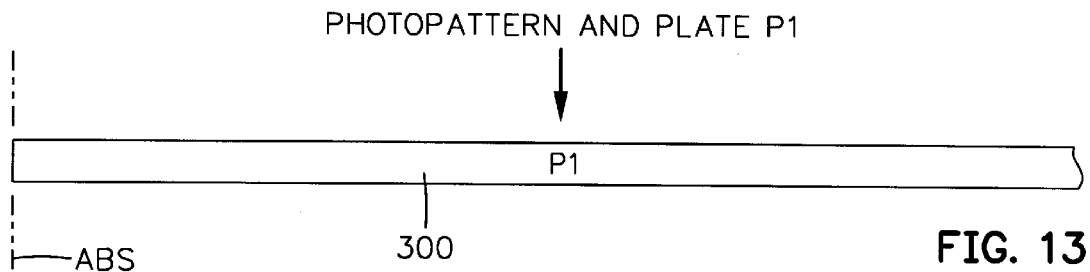
FIG. 13 is a side elevation view of the construction of a first pole piece of the write head embodiment shown in FIGS. 9 and 10.

A method of making the first write head embodiment shown in FIGS. 9 and 10 is shown in FIGS. 13–28. In FIG. 13 a first pole piece material layer 300 is formed by any suitable means such as photopatterning with photoresist and plating. The first pole piece material layer 300 may be formed on the second read gap layer 234 shown in FIG. 9. The left side of the first pole piece material layer 300 is an air bearing surface (ABS) site which is formed after all of the heads are completed on a wafer and diced into rows of heads. Accordingly, the first pole piece material layer 300 actually covers an entire wafer and then is subsequently processed, which will be described next.

Figure 14:
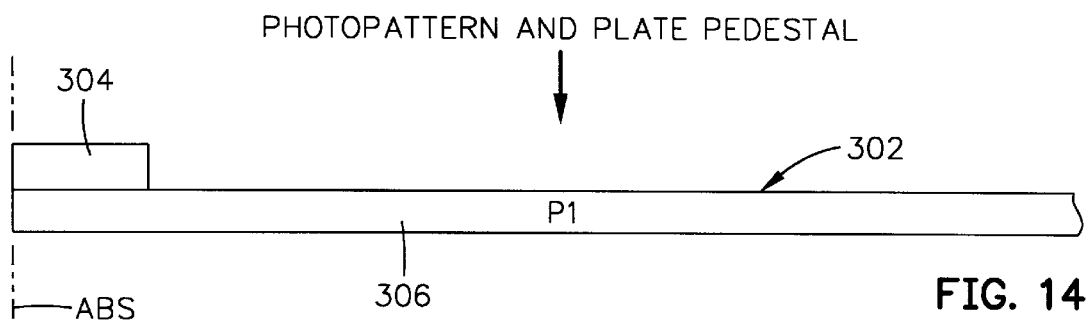
FIG. 14 is the same as FIG. 13 except the first pole piece has been ion milled in order to provide a pedestal at the ABS and a recessed portion therebehind.

In FIG. 14 the first pole piece layer 300 in FIG. 13 has been photopatterned and plated to provide a first pole piece 302 that has a pedestal portion 304 in a pole tip region and a recessed portion 306 which extends through the yoke region to at least the back gap (BG).

Figure 15:
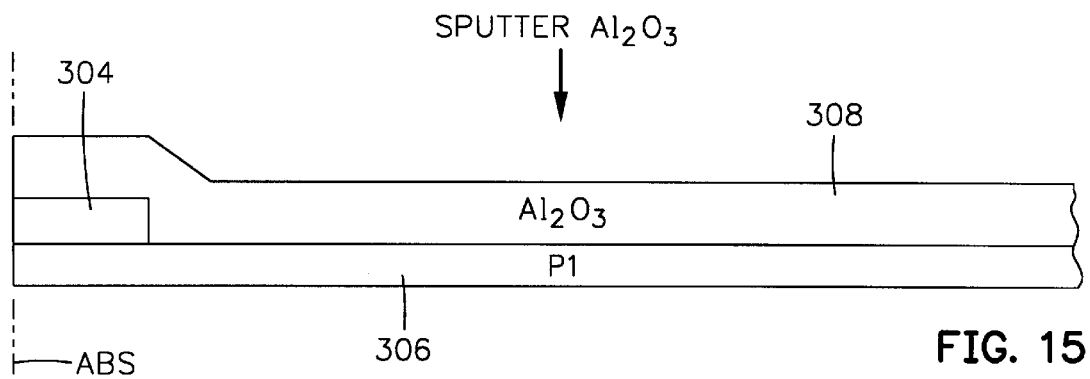
FIG. 15 is the same as FIG. 14 except a layer of aluminum oxide ($Al_2O_3$) has been sputtered onto the first pole piece.
Figure 16:
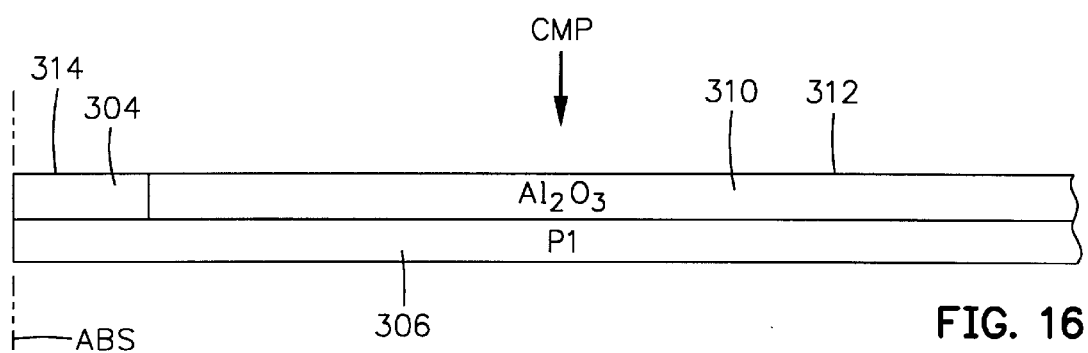
FIG. 16 is the same as FIG. 15 except the wafer has been chemically mechanically polished (CMP) to provide a planar surface of the aluminum oxide ($Al_2O_3$) layer and the pedestal portion of the first pole piece.
Figure 17:
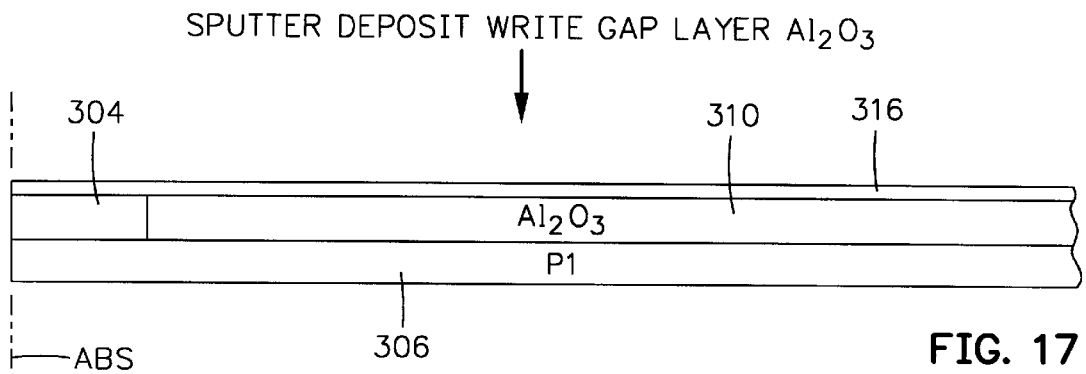
FIG. 17 is the same as FIG. 16 except a write gap layer has been formed.
Figure 18:
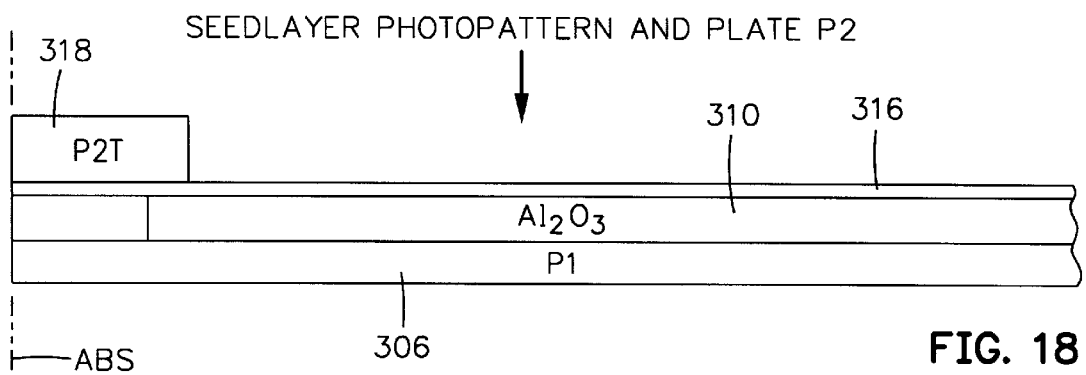
FIG. 18 is the same as FIG. 17 except a second pole tip has been formed.

In FIG. 15 a recessed insulation material layer 308 is deposited by any suitable means such as sputtering, which covers the pedestal 304 and the recessed portion 306 of the first pole piece. It is important that the thickness of the recessed insulation layer 308 be thicker and the height of the pedestal 304 above the recessed portion 306. In FIG. 16 the wafer is chemically mechanically polished (CMP) which forms the recessed insulation layer 310 with a top surface 312 that is planar with a top surface 314 of the pedestal portion 304 of the first pole piece. In FIG. 17 a write gap layer 316 is formed on the top surface of the pedestal portion 304 of the first pole piece layer. It is preferred that the write gap layer 316 also cover the recessed insulation layer 310 so as to eliminate a masking step. In FIG. 18 a second pole tip layer 318 is formed on the write gap layer 316 in the pole tip region.

Figure 19:
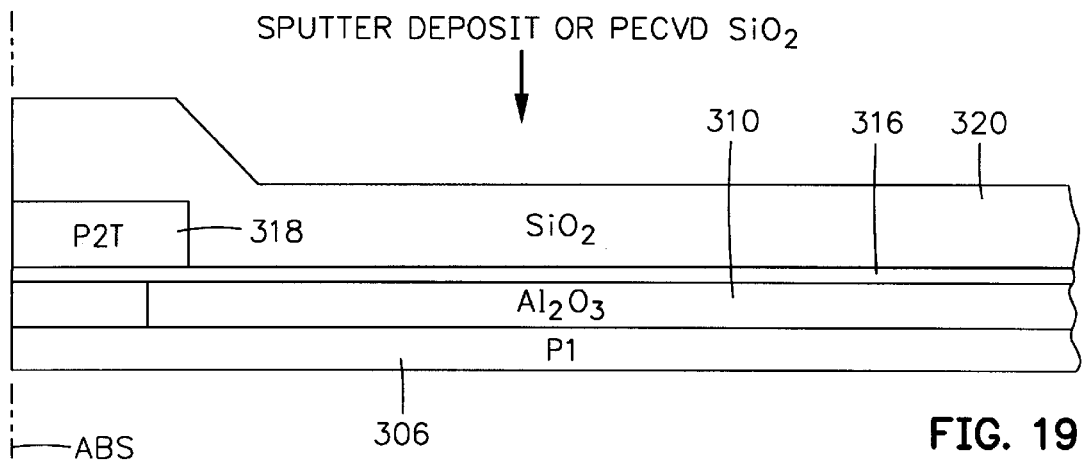
FIG. 19 is the same as FIG. 18 except a write coil mask material layer of etchable material has been formed on the second pole tip layer in the pole tip region and on the first pole piece in the yoke region and therebeyond.
Figure 20:
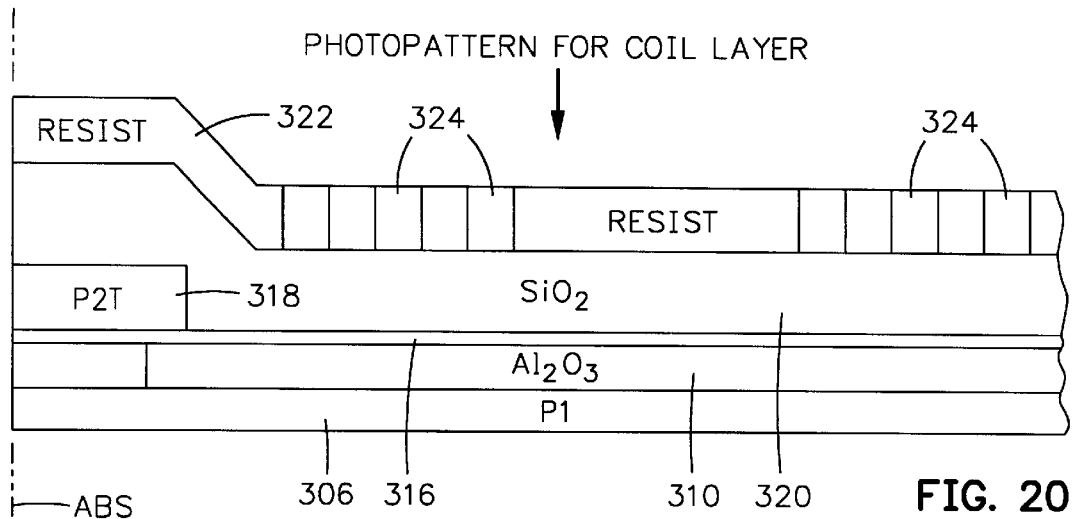
FIG. 20 is the same as FIG. 19 except a photoresist layer has been formed on the write coil mask material layer with photoresist layer openings exposing portions of the write coil mask material layer corresponding to a location of the write coil.
Figure 21:
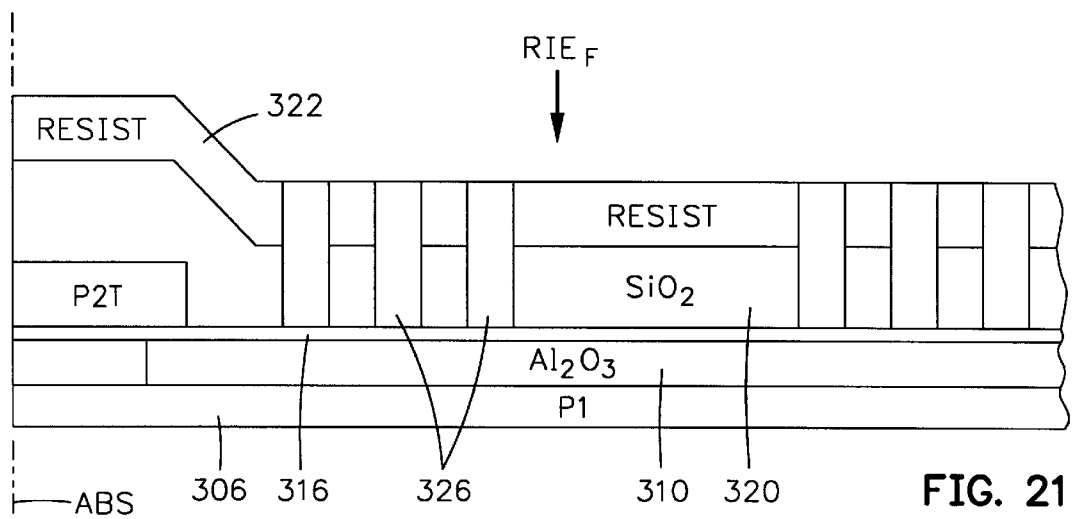
FIG. 21 is the same as FIG. 20 except the write coil mask material layer has been etched down to the write gap layer.
Figure 22:
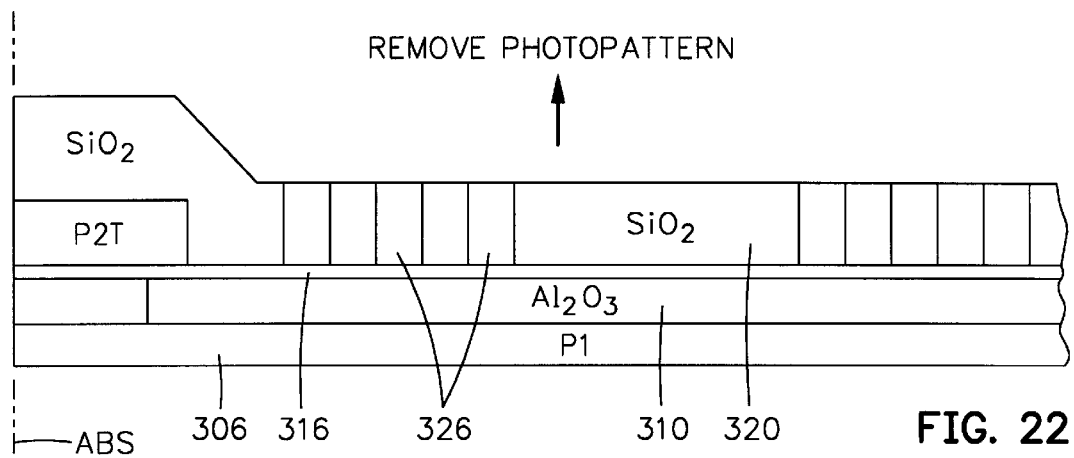
FIG. 22 is the same as FIG. 21 except the photoresist mask has been removed.

In FIG. 19 a write coil insulation material layer 320 is formed on the second pole tip layer 318 and on the write gap layer 316. It is important that the thickness of the layer 320 be thicker than the thickness of the second pole tip layer 318, which will be explained in more detail hereinafter. In FIG. 20 a photoresist material layer has been spun on the bead and patterned to provide a patterned photoresist layer 322 on the write coil insulation material layer 320 with a spiral-shaped opening 324 which exposes a portion of the top surface of the write coil insulation material layer 320 where a write coil is to be formed. Alternatively, an inorganic insulation material layer, such as $Al_2O_3$ or NiFe can be prepared for reactive ion etching (RIE) image transfer and then subsequently removed by chemical mechanical polishing (CMP). A preferable material for the write coil insulation material layer 320 is silicon dioxide ($SiO_2$), which is a material which can be etched by reactive ion etching (RIE) with a fluorine base such as $CF_4$, $CHF_3$, $C_2F_6$ or $SF_6$. In FIG. 21 the reactive ion etch (RIE) etches openings 326 in the write coil insulation material layer 320 where a write coil is to be formed. It should be noted that the reactive ion etching (RIE) is stopped at the gap layer 316 or at the recessed insulation layer 308 if the write gap layer is omitted from the yoke region. The gap layer 316 and the recessed insulation layer 308 are preferably aluminum oxide ($Al_2O_3$) which is not etched significantly by the fluorine-based RIE. Accordingly, when silicon dioxide ($SiO_2$) is employed for the write coil insulation material layer 320 and aluminum oxide ($Al_2O_3$) is employed for the write gap layer 316 or the insulation layer 308 the fluorine-based reactive ion etch is selective to the write coil insulation material layer 320.

Figure 23:
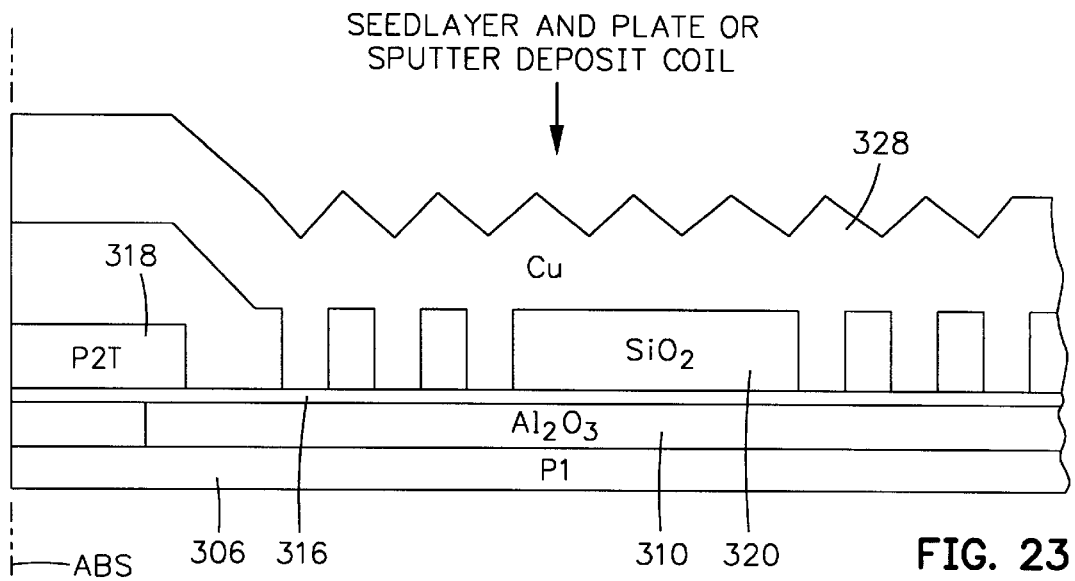
FIG. 23 is the same as FIG. 22 except a copper layer has been plated or sputter deposited on the wafer.
Figure 24:
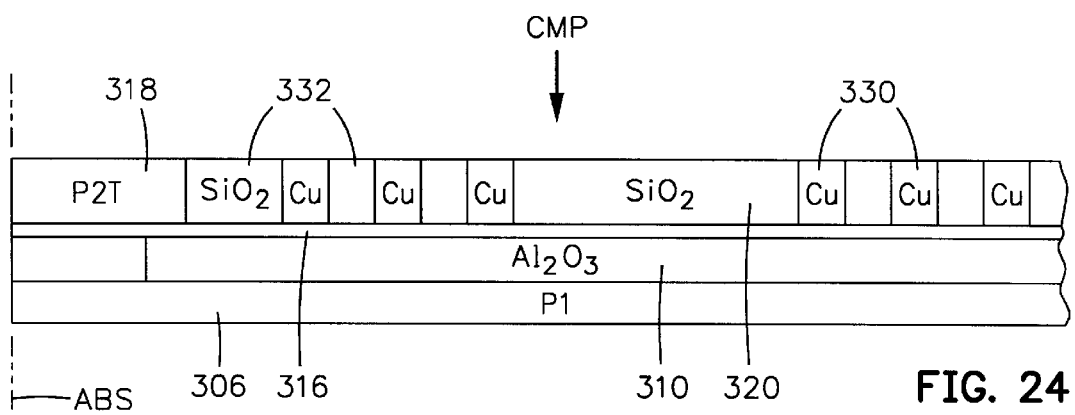
FIG. 24 is the same as FIG. 23 except the wafer has been chemically mechanically polished (CMP) to provide a planar surface of the top surfaces of the second pole tip, the write coil layer and the write coil insulation material therebetween.

In FIG. 23 a seed layer has been sputter deposited followed by formation of a write coil material layer 328 by any suitable means such as plating or sputter deposition. It is important that the thickness of this layer be thicker than the height of the second pole tip 318. In FIG. 24 the wafer is chemically mechanically polished (CMP) which forms a write coil layer 330 and the previously mentioned write coil insulation material layer 320 into a write coil insulation layer 332 which is located between the turns of the coil and between the coil layer 330 and the second pole tip 318. Top surfaces of the second pole tip 318, the coil layer 330 and the write coil insulation layer 332 form a common flat surface. This is important for subsequent construction of the second pole piece.

Figure 25:
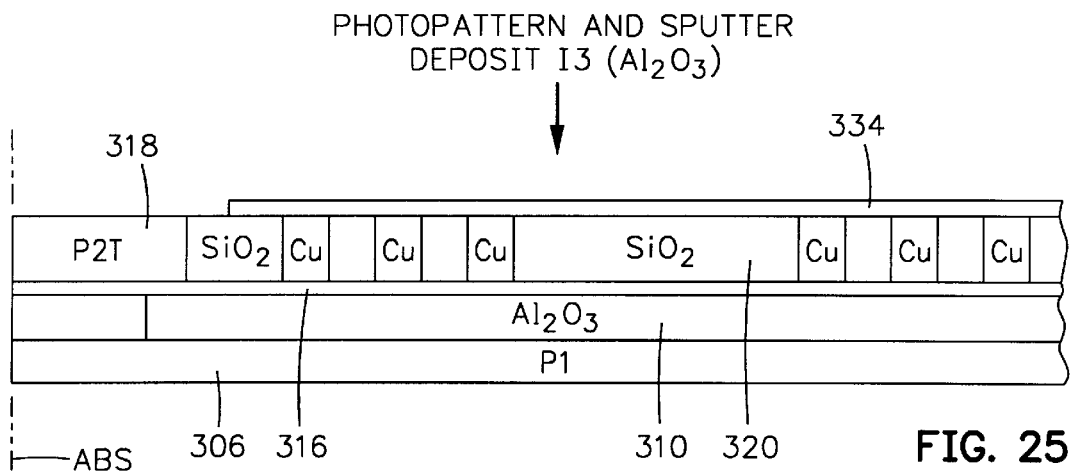
FIG. 25 is the same as FIG. 24 except a top insulation layer has been formed on top of the write coil.
Figure 26:
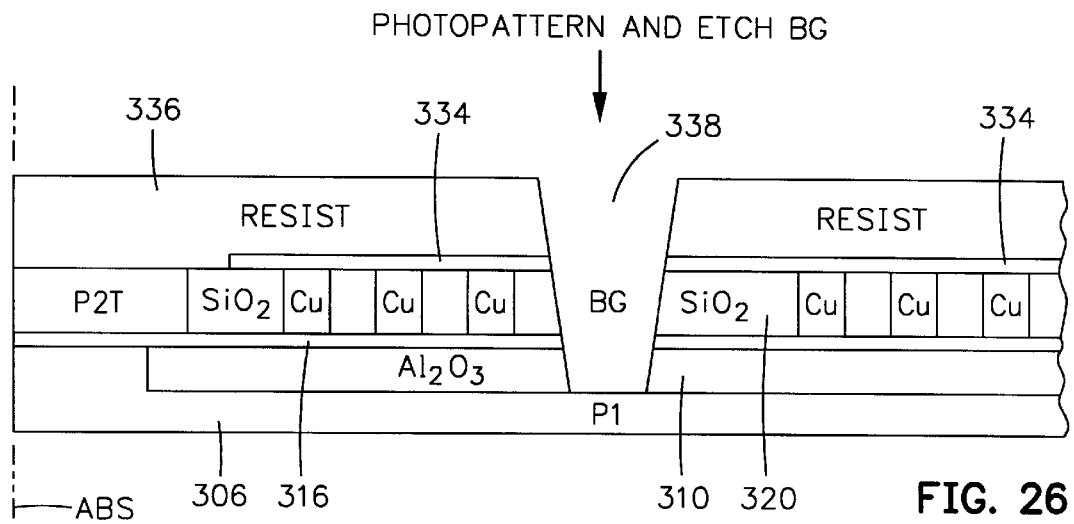
FIG. 26 is the same as FIG. 25 except a photoresist mask has been formed and the write coil insulation between the write coil and the write gap therebelow have been etched away for a back gap connection.
Figure 27:
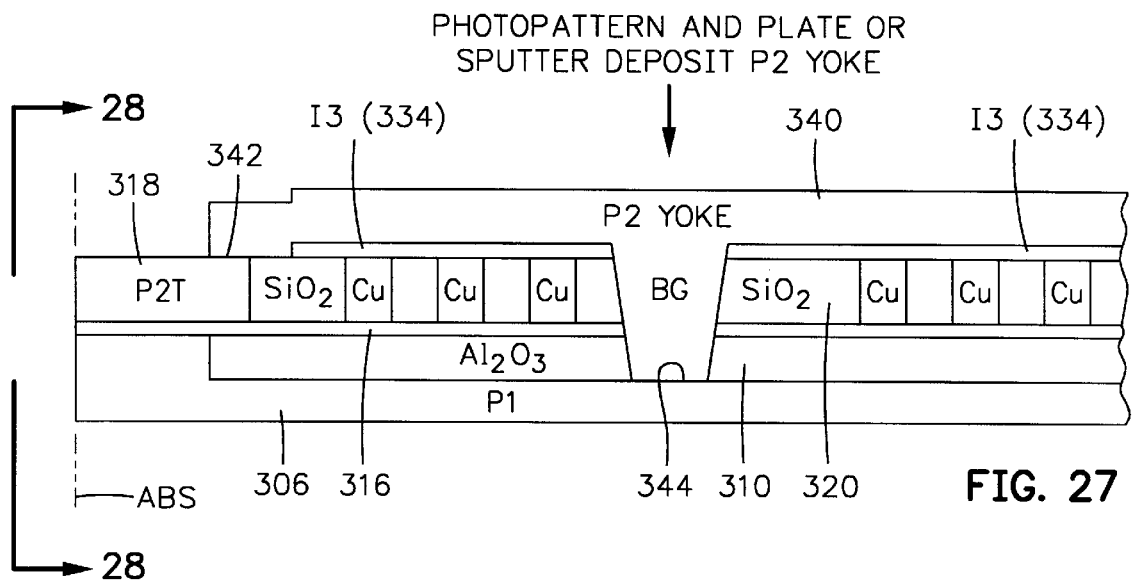
FIG. 27 is the same as FIG. 26 except the yoke portion of the second pole piece has been formed on top of the top insulation layer with connections to the second pole tip in the pole tip region and to the first pole piece at the back gap.

In FIG. 25 a top insulation layer 334 is formed on top of the top surface of the coil layer 330 by any suitable means such as photopatterning with photoresist and sputter deposition of aluminum oxide ($Al_2O_3$) followed by a lift off process. In FIG. 26 the wafer is photopatterned with patterned photoresist 336 that has an opening 338 where a back gap (BG) is to be formed. The wafer is then etched to etch through the write coil insulation layer 332, the write gap layer 316 and the recessed insulation layer 310 to expose the first pole piece in the back gap region. In FIG. 27 the yoke portion 340 of the second pole piece is formed on top of the top insulation layer 334 with a magnetic connection with the second pole tip 318 at 342 and a connection with the first pole piece at 344 in the back gap region.

Figure 28:
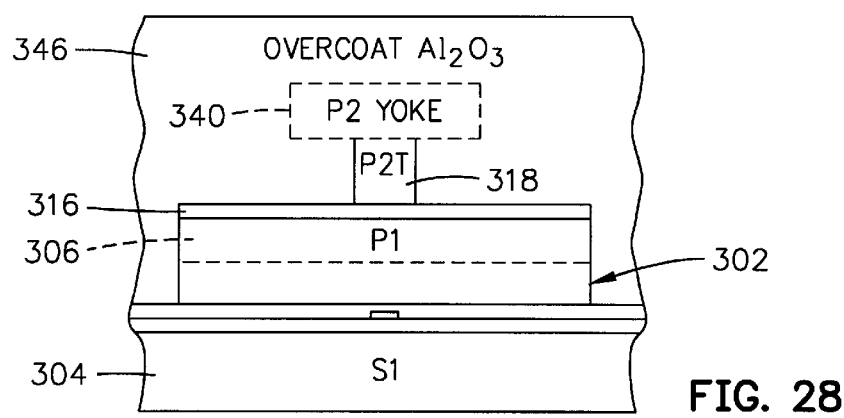
FIG. 28 is a view taken along plane 28—28 of FIG. 27 with an overcoat layer formed.
Figure 29:
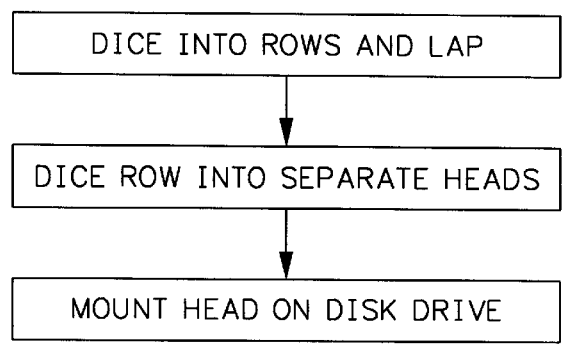
FIG. 29 illustrates in block form subsequent steps to complete the magnetic head and mount it in a disk drive.

FIG. 28 is an ABS illustration of FIG. 27 after formation of an overcoat layer 346. The material of the overcoat layer is preferably aluminum oxide ($Al_2O_3$). After construction of rows and columns of heads on a wafer, the wafer is diced into rows of heads and lapped to form the air bearing surface (ABS) as shown in FIG. 29. The rows and heads are then diced into separate heads and mounted on a disk drive for operation.

METHOD OF CONSTRUCTION OF THE SECOND EMBODIMENT OF THE WRITE HEAD

Figure 30:
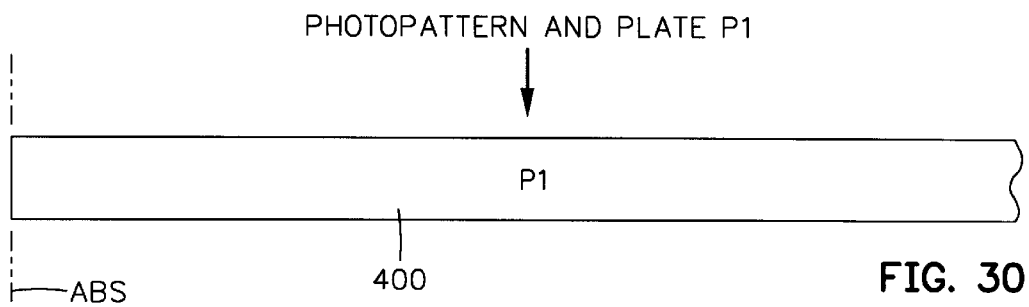
FIG. 30 is a side elevation illustration of the first pole piece of the embodiment of the invention shown in FIGS. 11 and 12.
Figure 31:
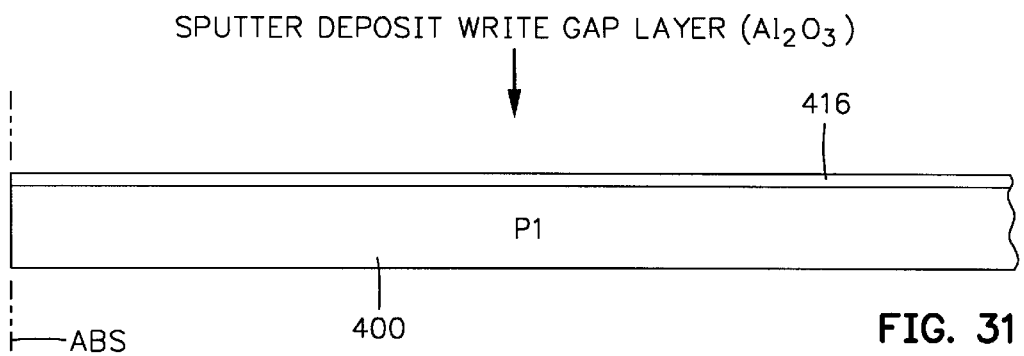
FIG. 31 is the same as FIG. 30 except a write gap layer has been formed thereon.
Figure 32:
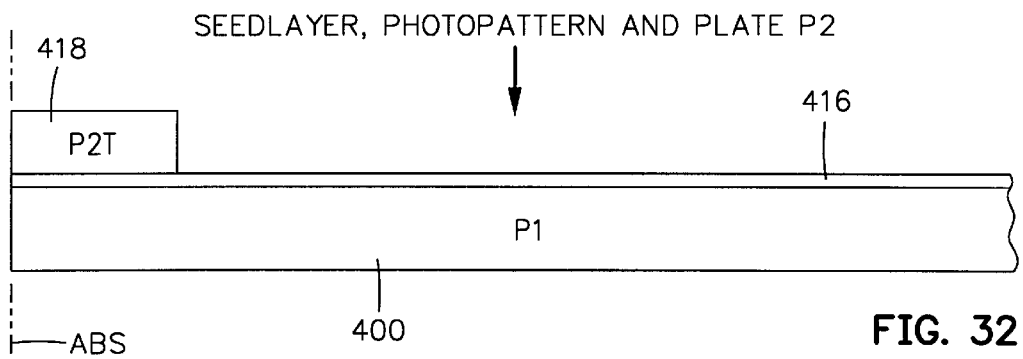
FIG. 32 is the same as FIG. 31 except the second pole tip has been formed in the pole tip region.

FIGS. 30–42 illustrate the method of constructing the second embodiment of the write head shown in FIGS. 11 and 12. In FIG. 30 a first pole piece layer 400 is constructed on the second read gap layer 234 shown in FIG. 11. The first pole piece layer 400 extends from an ABS site to at least the back gap region. In FIG. 31 a write gap layer 416 is formed on the first pole piece layer 400 from the ABS site to at least to the back gap region. The write gap layer may be formed by any suitable means such as sputter deposition and is preferably aluminum oxide ($Al_2O_3$). In FIG. 32 a second pole tip layer 418 is formed on the write gap layer 416 in the pole tip region.

Figure 33:
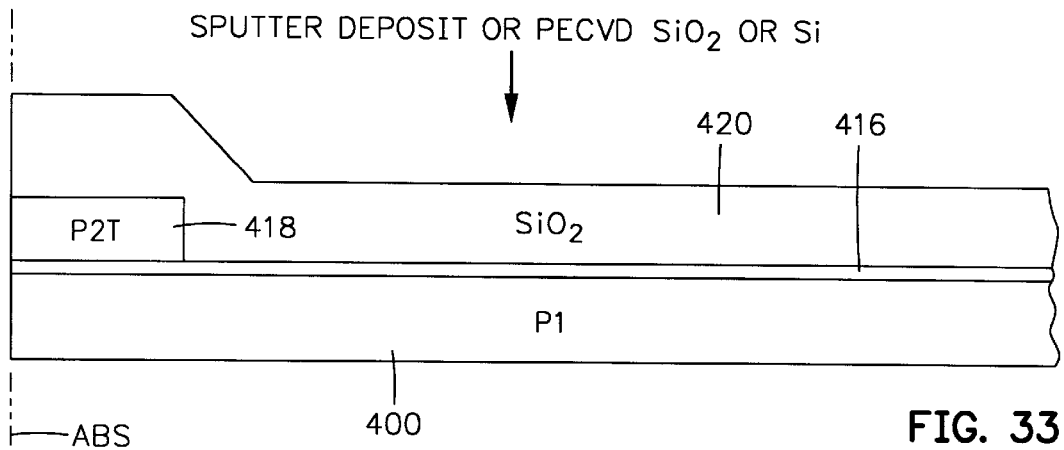
FIG. 33 is the same as FIG. 32 except a write coil mask material layer of etchable material has been formed on the second pole tip in the pole tip region and on the first pole piece in the yoke region and therebeyond.
Figure 34:
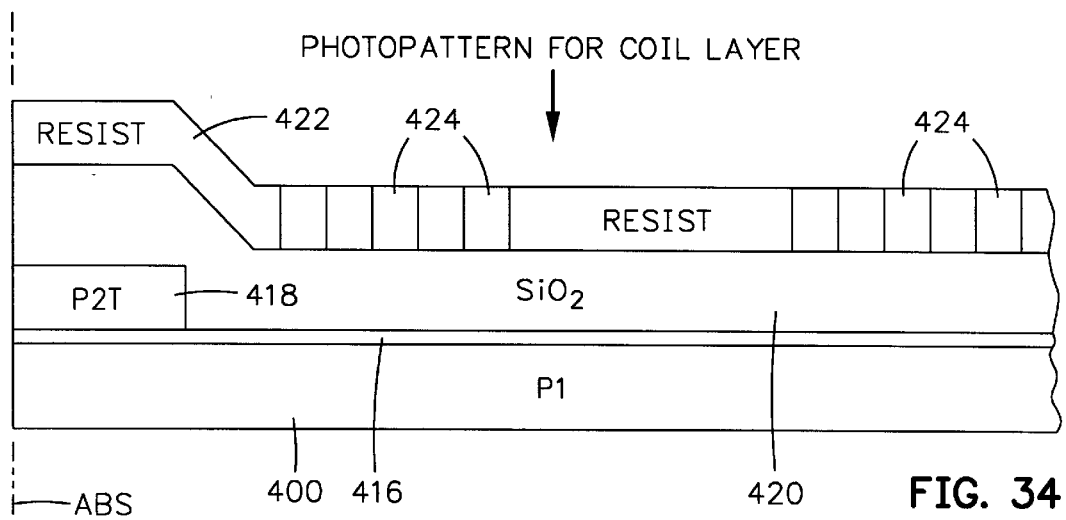
FIG. 34 is the same as FIG. 33 except a photoresist layer has been photopatterned on the write coil mask material layer with openings exposing a portion of the write coil mask material layer at a location where the write coil is to be formed.
Figure 35:
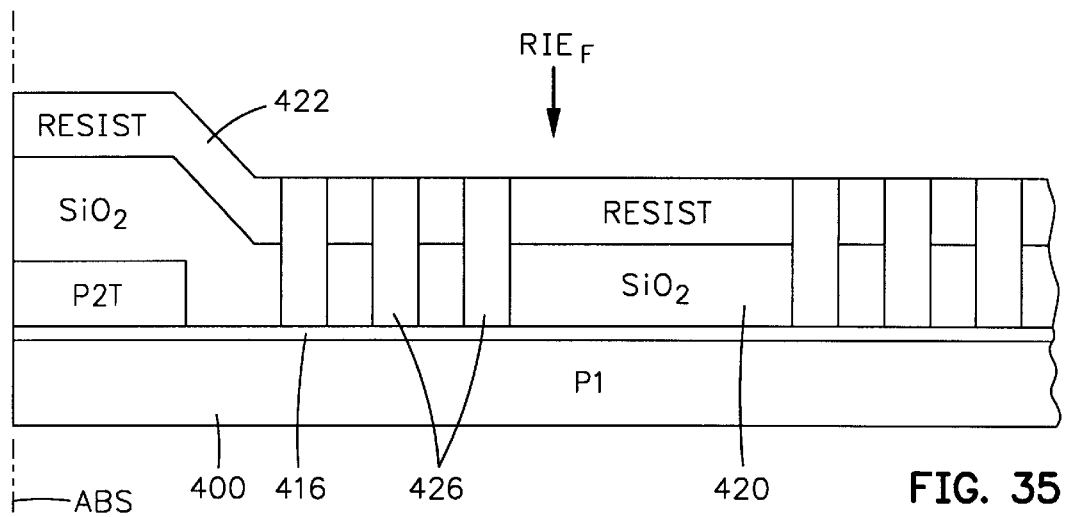
FIG. 35 is the same as FIG. 34 except reactive ion etching (RIE) has been implemented to etch the write coil mask material layer with openings down to the gap layer.
Figure 36:
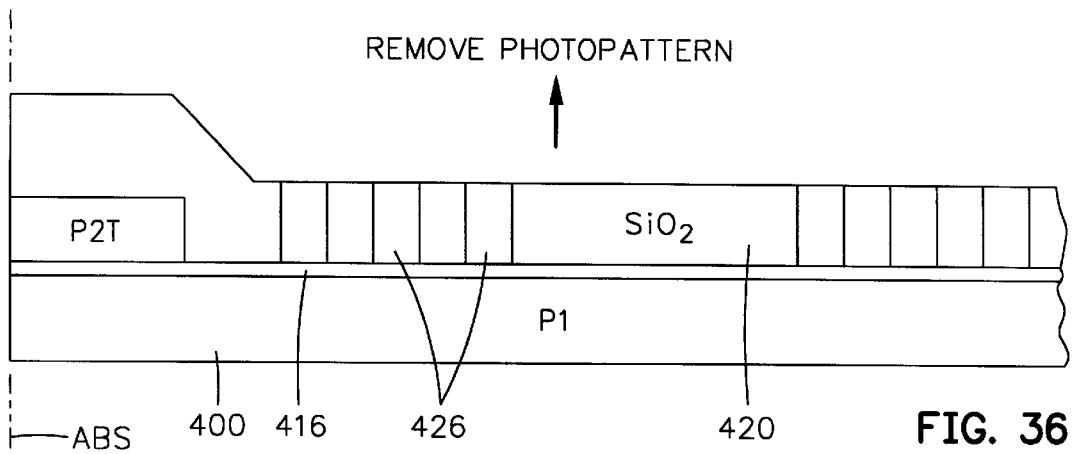
FIG. 36 is the same as FIG. 35 except the photoresist layer has been removed.

In FIG. 33 a write coil insulation material layer 420 is formed on the second pole tip layer 418 and on the write gap layer 416. It is important that the thickness of the layer 420 be thicker than the thickness of the second pole tip layer 418, which will be explained in more detail hereinafter. In FIG. 34 a photoresist material layer has been spun on the head and patterned to provide a patterned photoresist layer 422 on the write coil insulation material layer 420 with a spiral-shaped opening 424 which exposes a portion of the top surface of the write coil insulation material layer 420 where a write coil is to be formed. A preferred material for the write coil insulation material layer 420 is silicon dioxide ($SiO_2$) which is a material which can be etched by reactive ion etching (RIE) with a fluorine base such as $CF_4$, $CHF_3$, $C_2F_6$ or $SF_6$. In FIG. 35 the reactive ion etch (RIE) etches openings 426 in the write coil insulation material layer 420 where a write coil is to be formed. It should be noted that the reactive ion etching (RIE) is stopped at the gap layer 416. The gap layer 416 is preferably aluminum oxide ($Al_2O_3$) which is not etched by the fluorine-based RIE. Accordingly, when silicon dioxide ($SiO_2$) is employed for the write coil insulation material layer 420 and aluminum oxide ($Al_2O_3$) is employed for the write gap layer 416 the fluorine-based reactive ion etch is selective to the write coil insulation material layer 420 with respect to the write gap layer 416. Accordingly, the write gap layer 416 provides an etch stop so that the reactive ion etch (RIE) will not etch into the first pole piece layer 400. Further, the write gap layer 416 will serve as the only insulation layer between the first pole piece 400 and a write head to be subsequently constructed.

Figure 37:
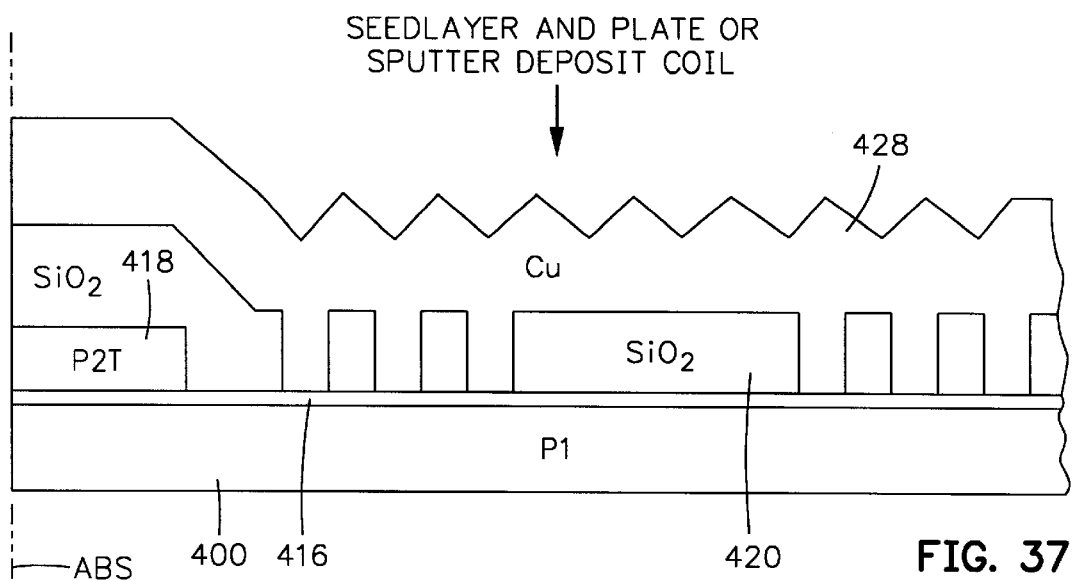
FIG. 37 is the same as FIG. 36 except a write coil material layer has been plated or sputter deposited.
Figure 38:
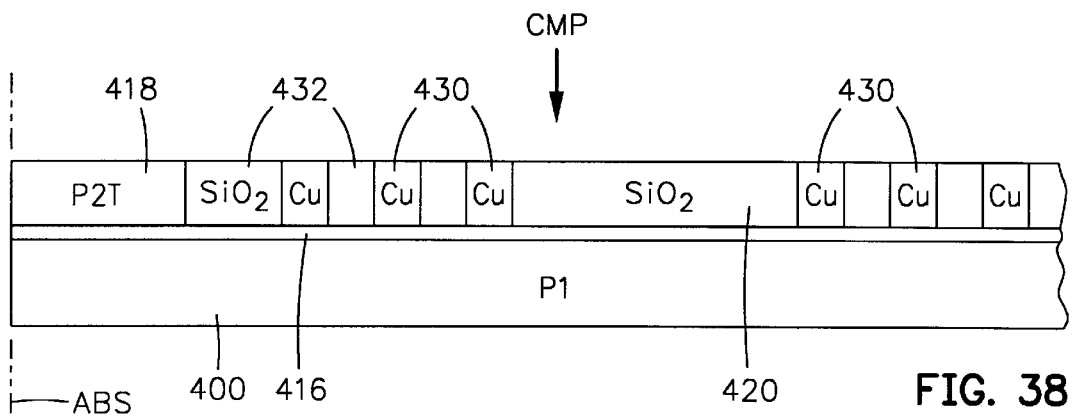
FIG. 38 is the same as FIG. 37 except the wafer has been chemically mechanically polished (CMP) to provide a planar surface of the top surface of the second pole tip, the coil layer and the write coil insulation material therebetween.

In FIG. 37 a seed layer has been sputter deposited followed by formation of a write coil material layer 428 by any suitable means such as plating or sputter deposition. It is important that the thickness of this layer be thicker than the height of the second pole tip 418. In FIG. 38 the wafer is chemically mechanically polished (CMP) which forms a write coil layer 430 and the previously mentioned write coil insulation material layer 420 into a write coil insulation layer 432 which is located between the turns of the coil and between the coil layer 430 and the second pole tip 418. Top surfaces of the second pole tip 418, the coil layer 430 and the write coil insulation layer 432 form a common flat surface. This is important for subsequent construction of the second pole piece.

Figure 39:
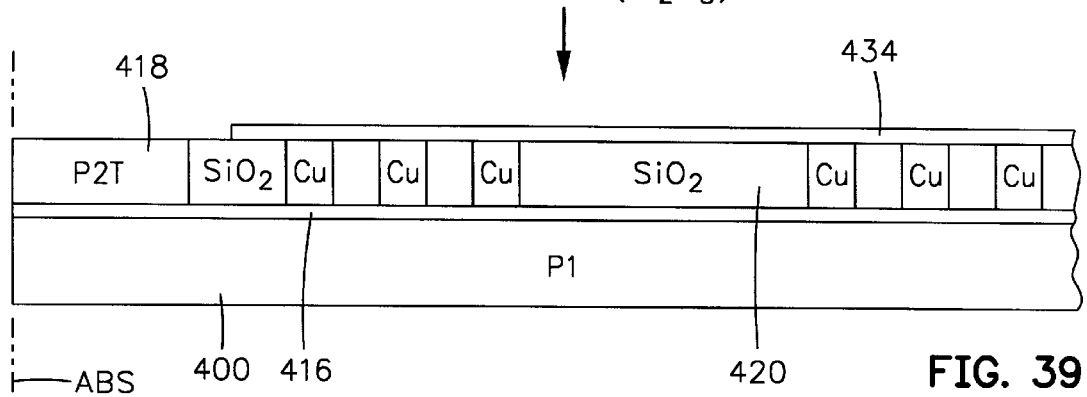
FIG. 39 is the same as FIG. 38 except a top insulation layer has been formed on top of the write coil layer.
Figure 40:
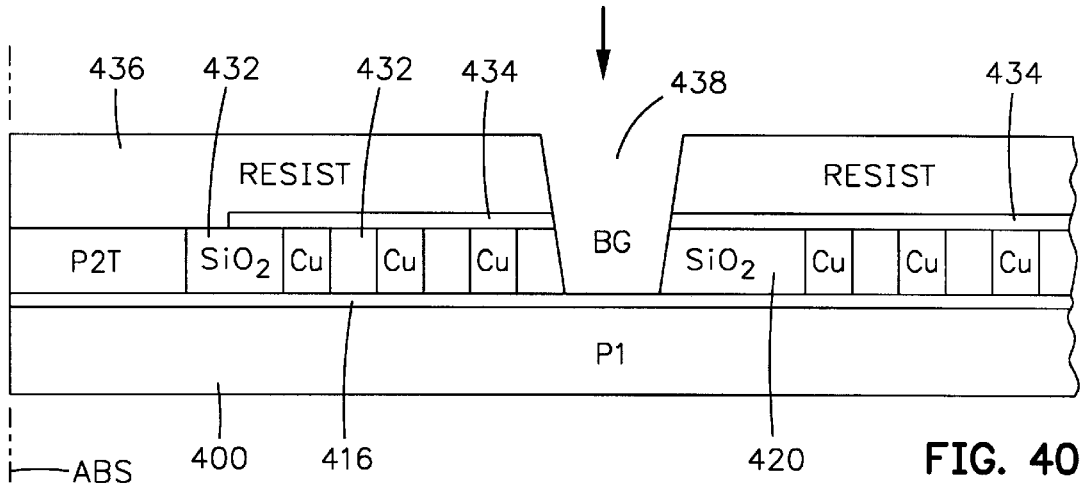
FIG. 40 is the same as FIG. 39 except a photoresist layer has been photopatterned and the wafer has been etched to provide an opening at the back gap.
Figure 41:
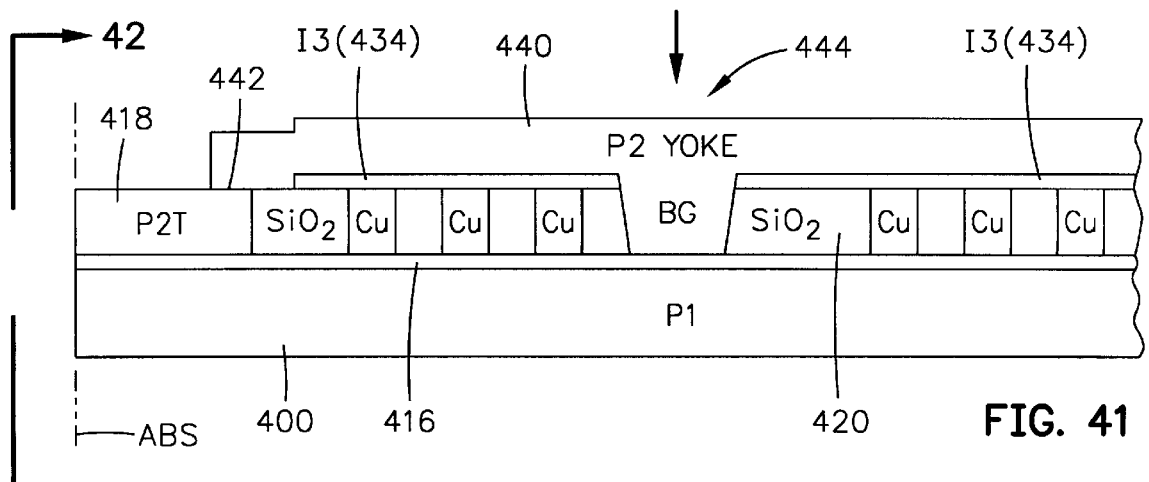
FIG. 41 is the same as FIG. 40 except the photoresist layer has been removed and the yoke portion of the second pole piece has been formed on top of the write coil insulation layer and connected to the second pole tip in the pole tip region and connected to the first pole piece in the back gap region.

In FIG. 39 a top insulation layer 434 is formed on top of the top surface of the coil layer 430 by any suitable means such as photopatterning with photoresist and sputter deposition of aluminum oxide ($Al_2O_3$). In FIG. 40 the wafer is photopatterned with patterned photoresist 436 that has an opening 438 where a back gap (BG) is to be formed. The wafer is then etched to etch through the write coil insulation layer 432 and the write gap layer 416 to expose the first pole piece in the back gap region. In FIG. 41 the yoke portion 440 of the second pole piece is formed on top of the top insulation layer 434 making a magnetic connection with the second pole tip 418 at 442 and making a magnetic connection with the first pole piece at 444 in the back gap region.

Figure 42:
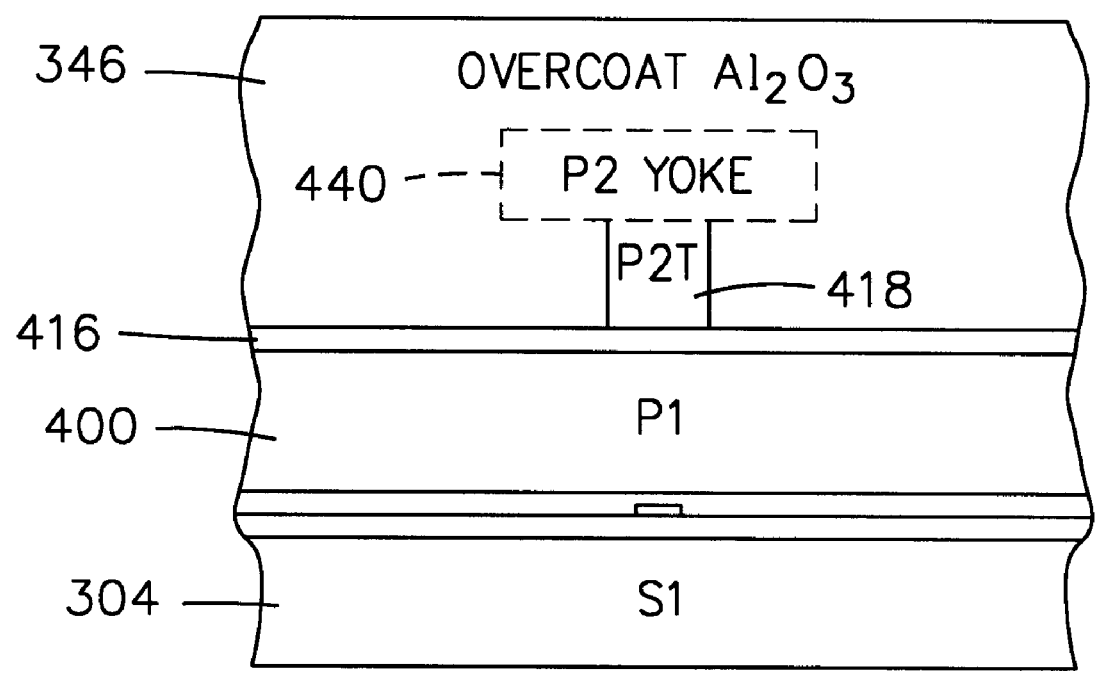
FIG. 42 is a view taken along plane 42—42 of FIG. 41 with an overcoat layer formed.

FIG. 42 is an ABS illustration of FIG. 41 after formation of an overcoat layer 446. The material of the overcoat layer is preferably aluminum oxide ($Al_2O_3$). After construction of rows and columns of heads on a wafer, the wafer is diced into rows of heads and lapped to form the air bearing surface (ABS) as shown in FIG. 29. The rows and heads are then diced into separate heads and mounted on a disk drive for operation.

Clearly, other embodiments and modifications of this invention will occur readily to those of ordinary skill in the art in view of these teachings. For instance, in a broad aspect of the invention the second pole piece in FIG. 11 may be stitched, as shown, or non-stitched wherein the top surfaces of the coil layer and the non-organic intercoil layer 260 are coplanar. Therefore, this invention is to be limited only by following claims, which include all such embodiments and modifications when viewed in conjunction with the above specification and accompanying drawings.

We claim:

1. A method of making a magnetic head that has an air bearing surface (ABS) and a yoke region between a pole tip region and a back gap region wherein the pole tip region is partially bounded by an air bearing surface (ABS) site that corresponds to said ABS, comprising:
    forming a ferromagnetic first pole piece in the pole tip, yoke and back gap regions;
    forming a nonmagnetic write gap layer on the first pole piece in the pole tip region;
    forming a second pole tip layer with a first thickness on the write gap layer in the pole tip region;
    forming a write coil as follows:
        forming a write coil insulation layer with a second thickness on the second pole tip layer and on the yoke and back gap regions of the first pole piece with a write coil opening at a location where a write coil is to be formed;
        forming a write coil material layer with a third thickness on the write coil insulation layer and in the write coil opening;
        each of the second and third thicknesses being greater than the first thickness; and
    first grinding away a portion of each of the write coil insulation layer and the write coil material layer until the write coil and the write coil insulation layer commonly form a first flat surface.

2. A method as claimed in claim 1 wherein said forming of the write gap layer also includes forming the write gap layer on the first pole piece in the yoke and back gap regions.

3. A method as claimed in claim 1 wherein said first grinding is chemical mechanical polishing (CMP).

4. A method as claimed in claim 1 wherein said forming of the write coil further includes:
    after forming the write coil insulation layer forming an electrically conductive first seed layer on said write coil insulation layer and in said write coil opening; and
    plating said write coil material layer.

5. A method as claimed in claim 1 including:
    forming a second pole piece layer connected to the second pole tip layer at a location recessed from said ABS site.

6. A method as claimed in claim 1 including:
    removing a portion of the write coil insulation layer in the back gap region to expose the first pole piece in the back gap region;
    forming an electrically insulative top insulation layer on said first common flat surface leaving the second pole tip layer and the back gap region of the first pole piece exposed; and
    forming a second pole piece layer on said top insulation layer and connected to the second pole tip layer in the pole tip region and connected to the first pole piece at said back gap.

7. A method as claimed in claim 6 wherein said forming of the write gap layer also includes forming the write gap layer directly on the first pole piece in the yoke and back gap regions.

8. A method as claimed in claim 7 wherein said step of removing a portion of the write coil insulation layer in the back gap region also includes removing a portion of the write gap layer in the back gap region.

9. A method as claimed in claim 6 including:
    said forming of the first pole piece includes forming a first pole piece with a pedestal portion with a fourth thickness in the pole tip region and a recessed portion in the yoke and back gap regions;
    depositing an aluminum oxide ($Al_2O_3$) recessed insulation layer on the pedestal portion and in the recessed portion of the first pole piece with a fifth thickness in said recessed portion;
    the fifth thickness being greater than the fourth thickness; and
    second grinding away a portion of the recessed insulation layer until the recessed layer and the pedestal portion of the first pole piece commonly form a second flat surface.

10. A method as claimed in claim 9 wherein said forming of the write gap layer also includes forming the write gap layer directly on the recessed insulation layer in the yoke and back gap regions.

11. A method as claimed in claim 10 wherein said step of removing a portion of the write coil insulation layer in the back gap region also includes removing a portion of the write gap layer in the back gap region.

12. A method as claimed in claim 1 wherein said forming of the write coil insulation layer includes:
    forming a write coil insulation material layer of etchable material with said second thickness on the second pole tip layer and on the yoke and back gap regions of the first pole piece;
    forming a photoresist material layer on the write coil insulation material layer;
    patterning the photoresist material layer to provide a patterned photoresist layer with a photoresist layer opening exposing a portion of the write coil insulation material layer corresponding to a location of the write coil;

etching through the photoresist layer opening to remove the exposed portion of the write coil insulation material layer to provide said write coil insulation layer with said write coil opening;

the etching being selective to the write coil insulation material layer with respect to the patterned photoresist layer; and removing said patterned photoresist layer.

13. A method as claimed in claim 12 wherein said forming of the write gap layer also includes forming the write gap layer directly on the first pole piece in the yoke and back gap regions.

14. A method as claimed in claim 13 wherein said write gap layer is aluminum oxide ($Al_2O_3$) and is aligned within said pattern opening and is an etch stop after etching of the write coil insulation material layer for protecting said first pole piece from etching.

15. A method as claimed in claim 12 wherein said etchable material is silicon dioxide ($SiO_2$) and said etching is reactive ion etching (RIE) with a fluorine base.

16. A method as claimed in claim 15 wherein said forming of the write gap layer also includes forming the write gap layer directly on the first pole piece in the yoke and back gap regions.

17. A method as claimed in claim 16 wherein said write gap is aluminum oxide ($Al_2O_3$) and is aligned within said pattern opening and is an etch stop after etching of the write coil insulation layer material layer for protecting said first pole piece from etching.

18. A method as claimed in claim 12 including:

said forming of the first pole piece includes forming a first pole piece with a pedestal portion with a fourth thickness in the pole tip region and a recessed portion in the yoke and back gap regions;

depositing an aluminum oxide ($Al_2O_3$) recessed insulation layer on the pedestal portion and in the recessed portion of the first pole piece with a fifth thickness in said recessed portion;

the fifth thickness being greater than the fourth thickness; and second grinding away a portion of the recessed insulation layer until the recessed layer and the pedestal portion of the first pole piece commonly form a second flat surface.

19. A method as claimed in claim 18 wherein said forming of the write gap layer also includes forming the write gap layer directly on the recessed insulation layer in the yoke and back gap regions.

20. A method as claimed in claim 19 wherein said step of removing a portion of the write coil insulation layer in the back gap region also includes removing a portion of the write gap layer in the back gap region.

21. A method as claimed in claim 20 wherein said etchable material is silicon dioxide ($SiO_2$) and said etching is reactive ion etching (RIE) with a fluorine base.

22. A method as claimed in claim 1 including:

said first thickness of the second pole tip layer being bounded by top and bottom flat surfaces wherein the bottom flat surface interfaces the write gap layer in the pole tip region; and said first grinding is continued until the write coil, the write insulation coil and said top flat surface of the second pole tip commonly form said first flat surface.

23. A method as claimed in claim 22 wherein said forming of the write gap layer also includes forming the write gap layer on the first pole piece in the yoke and back gap regions.

24. A method as claimed in claim 22 wherein said first grinding is chemical mechanical polishing (CMP).

25. A method as claimed in claim 22 wherein said forming of the write coil further includes:

after forming the write coil insulation layer forming an electrically conductive first seed layer on said write coil insulation layer and in said write coil opening; and plating said write coil material layer.

26. A method as claimed in claim 22 including:

forming a second pole piece layer connected to the second pole tip layer at a location recessed from said ABS site.

27. A method as claimed in claim 22 including:

removing a portion of the write coil insulation layer in the back gap region to expose the first pole piece in the back gap region;

forming an electrically insulative top insulation layer on said first common flat surface leaving the second pole tip layer and the back gap region of the first pole piece exposed; and forming a second pole piece layer on said top insulation layer and connected to the second pole tip layer in the pole tip region and connected to the first pole piece at said back gap.

28. A method as claimed in claim 27 wherein said forming of the write gap layer also includes forming the write gap layer directly on the first pole piece in the yoke and back gap regions.

29. A method as claimed in claim 28 wherein said step of removing a portion of the write coil insulation layer in the back gap region also includes removing a portion of the write gap layer in the back gap region.

30. A method as claimed in claim 27 including:

said forming of the first pole piece includes forming a first pole piece with a pedestal portion with a fourth thickness in the pole tip region and a recessed portion in the yoke and back gap regions;

depositing an aluminum oxide ($Al_2O_3$) recessed insulation layer on the pedestal portion and in the recessed portion of the first pole piece with a fifth thickness in said recessed portion;

the fifth thickness being greater than the fourth thickness; and second grinding away a portion of the recessed insulation layer until the recessed layer and the pedestal portion of the first pole piece commonly form a second flat surface.

31. A method as claimed in claim 30 wherein said forming of the write gap layer also includes forming the write gap layer directly on the recessed insulation layer in the yoke and back gap regions.

32. A method as claimed in claim 31 wherein said step of removing a portion of the write coil insulation layer in the back gap region also includes removing a portion of the write gap layer in the back gap region.

33. A method of making a magnetic head that has an air bearing surface (ABS) and a yoke region between a pole tip region and a back gap region wherein the pole tip region is partially bounded by an air bearing surface (ABS) site that corresponds to said ABS, comprising:

forming a ferromagnetic first pole piece in the pole tip, yoke and back gap regions;

forming a nonmagnetic write gap layer on the first pole piece in the pole tip region;

forming a second pole tip layer with a first thickness on the write gap layer in the pole tip region;

forming a write coil as follows:
   forming a write coil insulation material layer of etchable material with a second thickness on the second pole tip layer and on the yoke and back gap regions of the first pole piece;
   forming a photoresist layer on the write coil insulation material;
   patterning the photoresist layer to provide a patterned photoresist layer with a photoresist layer opening that exposes a portion of the write coil insulation material layer where the write coil is to be formed; and
   etching the exposed portion of the write coil insulation material layer through said photoresist layer opening to provide a write coil insulation layer with a write coil opening for said write coil;
   removing said photoresist layer;
plating a seed layer on the write coil insulation layer and into said write coil opening;
plating a write coil material layer with a third thickness onto the write coil insulation layer and into said write coil opening;
each of the second and third thicknesses being greater than the first thickness;
grinding away a portion of each of the write coil insulation layer and the write coil material layer to form a write coil, to form the write coil insulation material layer into a write coil insulation layer located between turns of the write coil and to form the write coil and the write coil insulation layer with a first common flat surface;
forming a second photoresist layer on the first common flat surface;
photopatterning the second photoresist layer to provide a second patterned photoresist layer opening that exposes a portion of the write coil insulation layer in the back gap region;
removing the exposed portion of the write coil insulation layer and exposing a portion of the first pole piece in the back gap region;
forming a top insulation layer on the flat surface of the write coil layer; and
forming a second pole piece layer on the top insulation layer and connecting the second pole piece layer to the second pole tip layer in the pole tip region and to the first pole piece in said back gap region.

34. A method as claimed in claim 33 wherein, before forming the first pole piece, forming a read head comprising:
   forming a ferromagnetic first shield layer;
   forming a nonmagnetic electrically insulative first gap layer on the first shield layer;
   forming a read sensor with first and second lead layers on the first gap layer;
   forming a nonmagnetic electrically insulative second gap layer on the read sensor, the first and second lead layers and the first gap layer; and
   employing the first pole piece as a second shield layer.

35. A method as claimed in claim 34 wherein said forming of the write gap layer also includes forming the write gap layer directly on the first pole piece in the yoke and back gap regions.

36. A method as claimed in claim 35 wherein said write gap is aluminum oxide ($Al_2O_3$) and is aligned within said pattern opening and is an etch stop after etching of the write coil material layer for protecting said first pole piece from etching.

37. A method as claimed in claim 36 wherein said etchable material is silicon dioxide ($SiO_2$) and said etching is reactive ion etching (RIE) with a fluorine base.

38. A method as claimed in claim 34 including:
   said forming of the first pole piece includes forming a first pole piece with a pedestal portion with a fourth thickness in the pole tip region and a recessed portion in the yoke and back gap regions;
   depositing an aluminum oxide ($Al_2O_3$) recessed insulation layer on the pedestal portion and in the recessed portion of the first pole piece with a fifth thickness in said recessed portion;
   the fifth thickness being greater than the fourth thickness; and
   grinding away a portion of the recessed insulation layer until the recessed layer and the pedestal portion of the first pole piece form a second common flat surface.

39. A method as claimed in claim 38 wherein said forming of the write gap layer also includes forming the write gap layer directly on the recessed insulation layer in the yoke and back gap regions.

40. A method as claimed in claim 39 wherein said etchable material is silicon dioxide ($SiO_2$) and said etching is reactive ion etching (RIE) with a fluorine base.

* * * * *